US006871557B2

(12) United States Patent
Magnussen, Jr. et al.

(10) Patent No.: US 6,871,557 B2
(45) **Date of Patent: *Mar. 29, 2005**

(54) PIPETTE DEVICE WITH TIP EJECTOR UTILIZING STORED ENERGY

(75) Inventors: Haakon T. Magnussen, Jr., Orinda, CA (US); Phillip Yee, San Francisco, CA (US); Albert Wang, Orinda, CA (US)

(73) Assignee: Rainin Instrument, LLC, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/304,591

(22) Filed: Nov. 26, 2002

(65) Prior Publication Data

US 2003/0074989 A1 Apr. 24, 2003

Related U.S. Application Data

(63) Continuation-in-part of application No. 09/497,829, filed on Feb. 3, 2000, now Pat. No. 6,523,837.

(51) Int. Cl.[7] .................................................. G01N 1/14

(52) U.S. Cl. ................................ 73/864.01; 73/864.16; 422/100

(58) Field of Search ......................... 73/864.01, 864.13, 73/864.14, 864.16; 422/100

(56) References Cited

U.S. PATENT DOCUMENTS

| | | | | | |
|---|---|---|---|---|---|
| 3,766,785 | A | * | 10/1973 | Smernoff | 73/864.14 |
| 4,151,750 | A | * | 5/1979 | Suovaniemi et al. | 73/864.14 |
| 4,283,950 | A | * | 8/1981 | Tervamaki | 73/864.14 |
| 5,435,197 | A | * | 7/1995 | Telimaa et al. | 73/864.14 |
| 6,199,435 | B1 | * | 3/2001 | Wilmer et al. | 73/864.14 |
| 6,532,837 | B1 | * | 3/2003 | Magussen et al. | 73/864.14 |
| 2002/0001545 | A1 | * | 1/2002 | Cronenberg et al. | 422/100 |
| 2003/0099578 | A1 | * | 5/2003 | Cote et al. | 422/100 |

* cited by examiner

*Primary Examiner*—Hezron Williams
*Assistant Examiner*—Nashmiya Fayyaz
(74) *Attorney, Agent, or Firm*—Robert R. Meads

(57) ABSTRACT

A pipette for use with a pipette tip to aspirate and dispense a quantity of liquid, comprising a housing, a pipette tip mounting shaft extending from the housing to receive a pipette tip, a pipette tip ejector mechanism for ejecting the pipette tip from the mounting shaft, energy storage means, means for storing energy in the energy storage means and means for releasing energy from the energy storage means to assist the tip ejector mechanism in the ejecting of the pipette tip from the mounting shaft.

19 Claims, 23 Drawing Sheets

PIPETTE DEVICE WITH TIP EJECTOR UTILIZING STORED ENERGY

RELATED PATENT APPLICATION

This application is a continuation-in-part of parent U.S. patent application Ser. No. 09/497,829 filed Feb. 3, 2000 now U.S. Pat. No. 6,532,837.

BRIEF DESCRIPTION OF THE INVENTION

This invention relates to pipette devices for use with removably mounted tips and more particularly to pipette devices having mechanisms for ejecting the removably mounted tips.

BACKGROUND OF THE INVENTION

Most hand held manual or electronic pipettes have a mechanism for ejecting a disposable tip secured to the shaft of the pipette. Prior to the recently developed LTS System of Rainin Instrument, LLC, which is characterized by pipette tip mounting and ejection forces of less than one pound, the static holding friction or mounting forces required for retaining a tip in a fluid tight sealed condition on the shaft of a pipette is typically greater than four to six pounds in order to withstand the lateral forces exerted on the tip during touching off in normal pipetting activities. During pipette tip ejection such frictional retention or mounting forces must be overcome in order to start moving the tip off the shaft. The required peak pipette tip ejection force is typically in the range of eight to twelve pounds, but can be as high as 20 pounds. Once the tip begins to move off of the pipette shaft, the force required to continue moving the tip reduces to approximately 50% to 60% of the frictional retention force.

One common tip ejector mechanism is a spring biased rod with a thumb actuated button on its upper end. The lower end of the rod is secured to a collar positioned adjacent the upper end of the disposable tip. See, for example, U.S. Pat. No. 3,991,617 and U.S. Pat. No. Re. 32,210. When the user presses down on the button, the lower end of the rod presses against the tip. The user must supply an ejection force which equals or exceeds the frictional retention force in order to eject the tip from the shaft of the pipette. Most users do not have sufficient time following movement of the tip down the shaft to reduce the applied ejection force from the initial ejection force. Instead, the user continues to exert the peak ejection force until the ejector impacts the bottom stop of the tip ejector mechanism. Static stress on the order of eight to twelve pounds followed by a rapid movement and a sudden stop, causing an impact on the thumb, can contribute to repetitive motion injuries to the hand and wrist when repeated many times daily over long periods of time.

Several different approaches have been used to reduce the stress in a user's thumb or finger(s) from tip ejection forces. One such approach is to use a mechanical advantage, for example by means of cams, gears or a lever mechanism, to reduce the forces required to eject a tip. See for example U.S. Pat. Nos. 4,779,467 and 5,435,197. These reduced forces, however, come at the expense of additional motion required by the user's thumb or finger(s). The total energy or work supplied by the user's thumb or finger(s) is at least as much as that required for the traditional push rod mechanism. Furthermore, practical designs are limited to a mechanical advantage of 2:1, because of limitations on the accompanying travel distances and time, and are thus capable of reducing the forces only by a factor of two. Another approach is to reduce the frictional retention force holding the tip on the pipette shaft. One such solution uses an o-ring on the shaft to form a soft, compliant seal with the inside surface of the tip. See in this regard the Transferpette Multichannel pipettes from BrandTech Scientific of Essex, Conn. Unfortunately, the lower retention force provided by such o-ring seals comes at the cost of reduced sealing reliability and increased maintenance as well as increased possibilities of contamination.

Other approaches for reducing tip ejection forces focus on the tip. For example, U.S. Pat. Nos. 4,072,330 and 4,748,859 disclose a disposable tip with increased compliance for decreasing frictional retention force. These devices, however, suffer from decreased lateral tip stability.

Another approach uses a motor driven tip ejector mechanism. See for example U.S. Pat. No. 4,399,712. This approach minimizes stress on the user's thumb or finger(s), but suffers from disadvantage that the direct drive must have sufficient strength to generate the peak force required to eject a tip without stalling or causing undue wear on the mechanism. In addition, excess stroke distance must be provided at the end of the normal pipette cycle to eject the tip. As a result, additional head space volume must be added to accommodate the extra piston stroke distance and the pipette body must be lengthened. Another motorized ejector mechanism is described in U.S. Pat. No. 4,616,514 and utilizes a proprietary tip design having a soft seal on the end of the tip for improved sealing and easy tip ejection.

As can be see from the foregoing, many of the current solutions for minimizing the stress of the hand and/or wrist of a pipette user from tip ejection have accompanying disadvantages. It would be desirable to develop a new pipette which overcomes these disadvantages.

More recently, and since the Feb. 3, 2000 filing of the parent patent application Ser. No. 09/497,829, U.S. Pat. No. 6,324,925 and U.S. Patent Application US 2002/00015445 have been published describing pipettes with mechanisms for ejecting pipette tips from the nozzle or mounting shaft of a pipette. In the '925 patent, which issued Dec. 4, 2001, an embodiment is described which provides a spring between a piston and a pipette tip removal means. When the removal means is a home position, the spring is compressed. When the spring is released from its compressed state, as by movement of the piston, the removal means is moved to a removal position to detach the pipette tip from the pipette. While the patent states that the spring locks in its compressed state when attaching the pipette tip to the pipette, no means for so compressing and locking the spring are shown, described or suggested in the patent. In fact, with the structure shown in the patent, the mounting of a pipette tip on the nozzle or mounting shaft of the pipette will not compress or lock the spring in its compressed state.

In the published patent application, which was filed on Jun. 4, 2001 and published Jan. 3, 2002, a pipette is described which includes a mechanism for storing energy when a pipette tip is mounted on a nozzle of the pipette. That energy is released when the pipette tip is to be removed from the nozzle to facilitate removal thereof. Interestingly, the priority date for the subject matter described in the published patent application is somewhat later than the Feb. 3, 2000 filing date of the parent patent application upon which this continuation-in-part patent application is based and claims of the parent patent application and this continuation-in-part application appear to cover much of the subject matter of the published patent application.

SUMMARY OF THE INVENTION

In general, the invention provides a pipette for repeatedly aspirating and dispensing a predetermined quantity of liquid.

Basically, the pipette includes a pipette tip mounting shaft extending from a housing and a tip ejector mechanism for ejecting a tip from the mounting shaft. The pipette also includes an energy storage and means including a pipette tip and/or tip ejector for storing energy in the storage. Energy released from the storage assists the tip ejector mechanism in ejecting the tip from the mounting shaft. Preferably, the housing of the pipette is hollow and has first and second extremities. The second extremity comprises the mounting shaft and is adapted to removably receive the pipette tip. An ejector is carried by the housing and has a first extremity disposed within the first extremity of the housing and a second extremity movable about the second extremity of the housing. The ejector is movable from a first position for permitting the pipette tip to be securely mounted on the second extremity of the housing and a second position for pushing the pipette tip off of the second extremity of the housing. The energy storage may comprise a spring in which case the pipette includes means for compressing the spring so as to store energy in the spring. In addition, locking means may be carried by the housing for retaining the spring in the compressed position and release means may be provided for releasing the locking means so that the ejector is driven by the spring to the second position to move the pipette tip distally on the second extremity of the housing.

BRIEF DESCRIPTION OF THE DRAWINGS

Several preferred embodiments of the invention are set forth in detail in the accompanying schematic drawings.

DETAILED DESCRIPTION OF THE INVENTION

Figure 1:
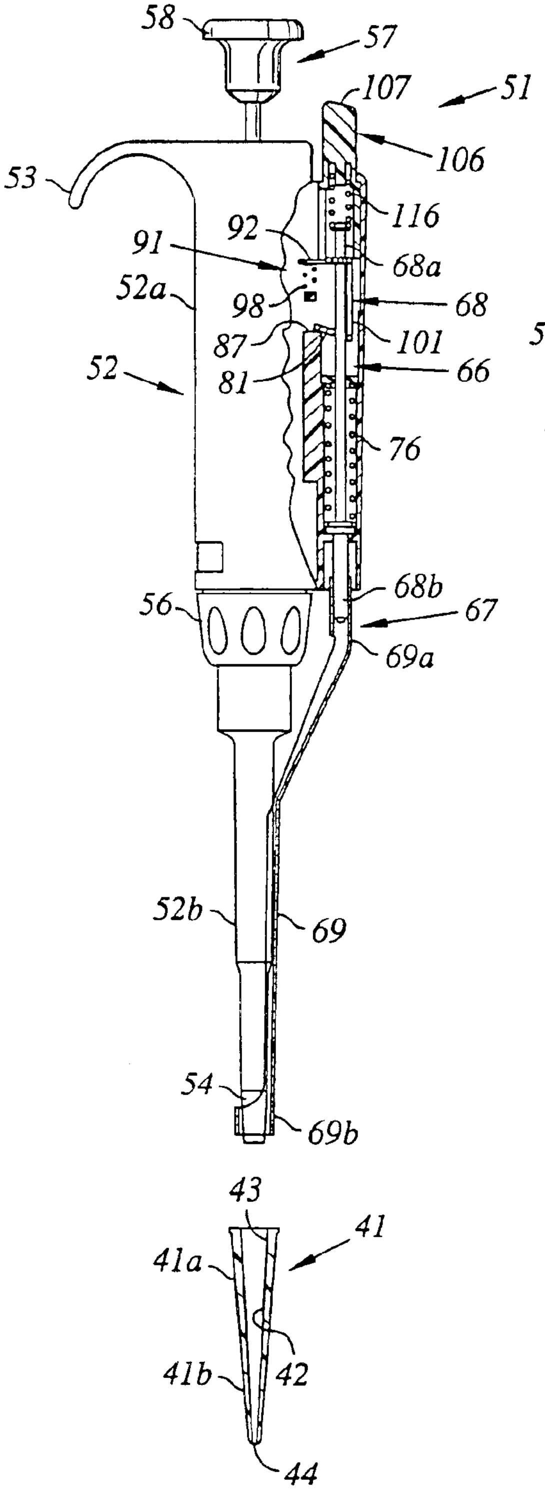
FIG. 1 is a side elevational view of a partially cross-sectioned pipette device with tip ejector utilizing stored energy in accordance with the present invention, the pipette device being without a disposable tip mounted on a shaft of the device.

Reference will now be made in detail to the preferred embodiments of the invention which are illustrated in the accompanying figures. The description of each embodiment of the invention will be followed by a discussion of its operation.

As illustrated in FIGS. 1–7, in one embodiment of the pipette with tip ejector utilizing stored energy in accordance with the present invention, a pipette 51 formed from a housing 52 having a handle 52*a* and a shaft 52*b* is provided. The pipette 51 is for use with a conventional tip 41 of the type manufactured by Rainin Instrument, LLC of Oakland, Calif. An ejector assembly 66 is carried by the housing 52 for pushing tip 41 off the distal end of the housing 52. The ejector assembly includes an eject spring 76 which is compressed to store energy under the force of an ejector 67 when a user mounts the tip 41 onto the distal end portion of the shaft 52*b*. The ejector assembly further includes locking means for retaining the eject spring in its compressed condition and release means actuatable by the user to release the ejector 67 which is then driven by the eject spring 76 to push the tip 41 off of the distal end portion of the pipette.

Figure 2:
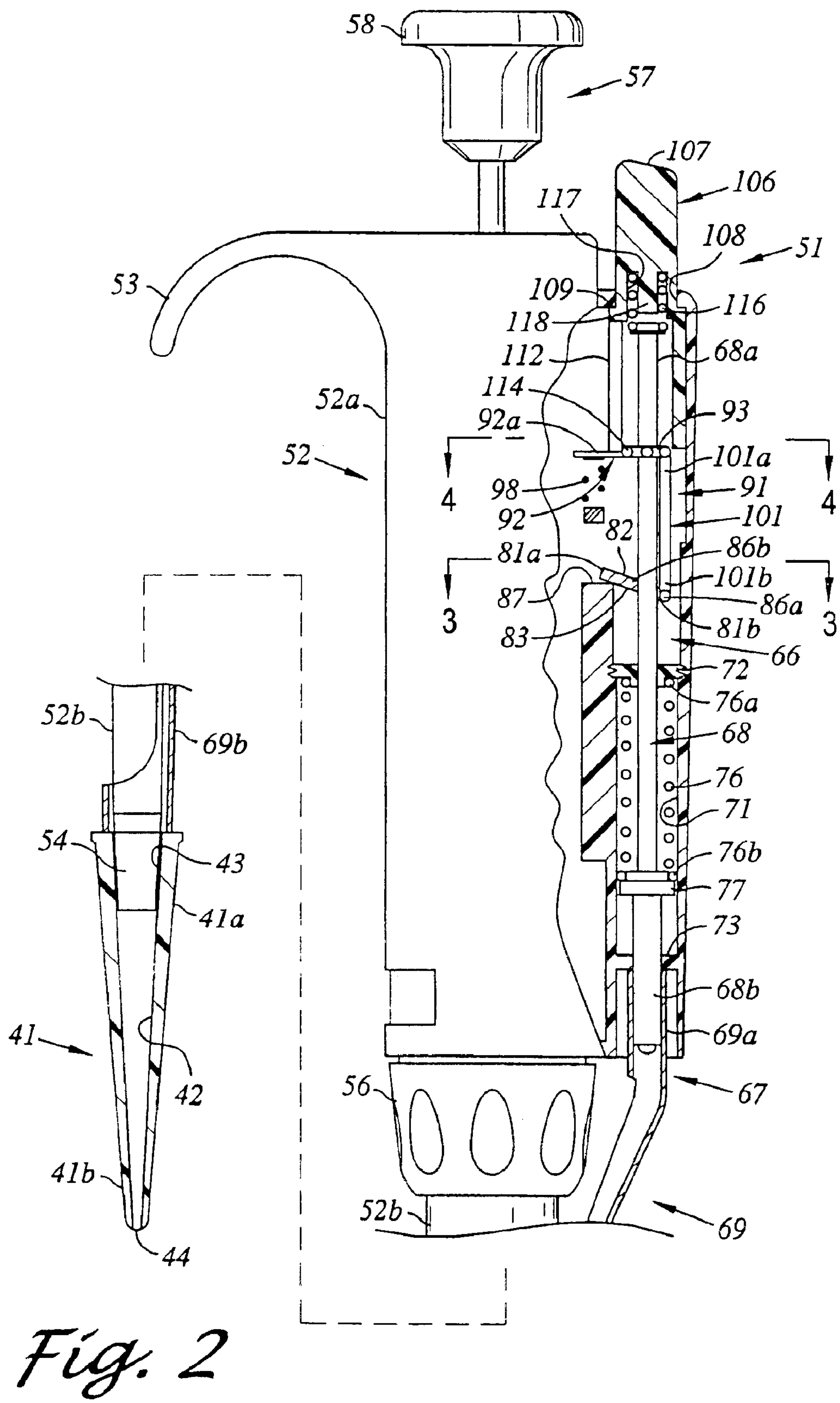
FIG. 2 is a fragmentary and partially cross-sectioned view of the pipette device of FIG. 1 with a disposable tip mounted on the shaft of the pipette device.

More specifically, tip 41 is generally conical in shape and made from any suitable material such as plastic and preferably clear plastic. As depicted in FIGS. 1 and 2, where tip 41 is shown in cross section, a generally conical bore 42 commences at an opening 43 provided at the proximal end 41*a* of the tip. Bore 42 reduces in diameter as it extends from proximal opening 43 to a distal opening 44 formed in the distal end 41*b* of the tip.

Pipette 51 is for use with a human hand to repeatedly aspirate and dispense a predetermined quantity of liquid and includes the hollow body or housing 52 having a first extremity or handle portion 52*a* adapted to be grasped by the hand of the user and a second extremity or shaft portion 52*b* adapted to removably receive the pipette tip 41 (see FIGS. 1–7). Handle portion or handle 52*a* is substantially cylindrical in shape and is sized to be held within a human hand. More particularly, handle 52*a* is sized so that the user's hand wraps substantially around the handle. An arcuate extension or finger hook 53 extends from one side of the tip of handle 52*a* for facilitating retention of the pipette in the hand of the user. Shaft portion of shaft 52*b* is substantially cylindrical in shape and it has a diameter which is smaller than the diameter of handle 52. A substantially cylindrical end portion or distal end 54 of shaft 52*b* is sized so as to fit within the proximal end 41*a* of pipette tip 41, which is press fit onto the shaft distal end portion54. Handle 52*a* and shaft 52*b* are aligned on a longitudinal or vertical axis of pipette 51. Shaft 52*b* is secured to handle 52*a* by any suitable means such as annular nut 56. Each of handle 52*a*, shaft 52*b* and nut 56 are made from any suitable material such as plastic.

A bore (not shown) extends through shaft 52*b* and communicates with an opening (not shown) in distal end 54 for providing suction or pressure to respectively aspirate or dispense liquid from the pipette tip 41 when secured to the distal end portion 54 of the shaft 52*b*. Manual pipette 51 has means actuatable from handle 52*a* for so aspirating the liquid into and dispensing such liquid from the pipette tip 41. Such means includes a plunger 57 slidably disposed within handle 52*a* and accessible from the tip of the handle. A knob 58 is secured to the top free end of plunger 57 for facilitating manual actuation of the aspirating and dispensing means of pipette 51.

The finger operable ejector assembly 66 is carried by housing 52 for pushing pipette tip off distal end portion 54 and includes an ejector mechanism or ejector 67 having a first extremity or rod 68 slidably disposed within housing handle 52*a* and a second extremity or extension 69 extending alongside shaft 52*b* exterior of housing 52. Elongate rod 68 is cylindrical in shape and has a first or proximal end portion 68*a* and a second or distal end portion 68*b* and is made from metal or any other suitable material. Eject rod 68 extends along an axis that is parallel to the vertical axis of pipette 51. Extension 69 is made from any suitable material such as metal and has a first or proximal end portion 69*a* and a second or distal end portion 69*b*. The proximal end portion of extension 69 is substantially tubular in conformation and press fit or otherwise suitably secured around distal end portion 68*b* of the rod 68. Distal end portion or collar 69*b* of the extension 69 is also substantially tubular in conformation and is disposed about distal end portion 54 of the shaft 52*b* for vertical movement thereon.

Figure 7:
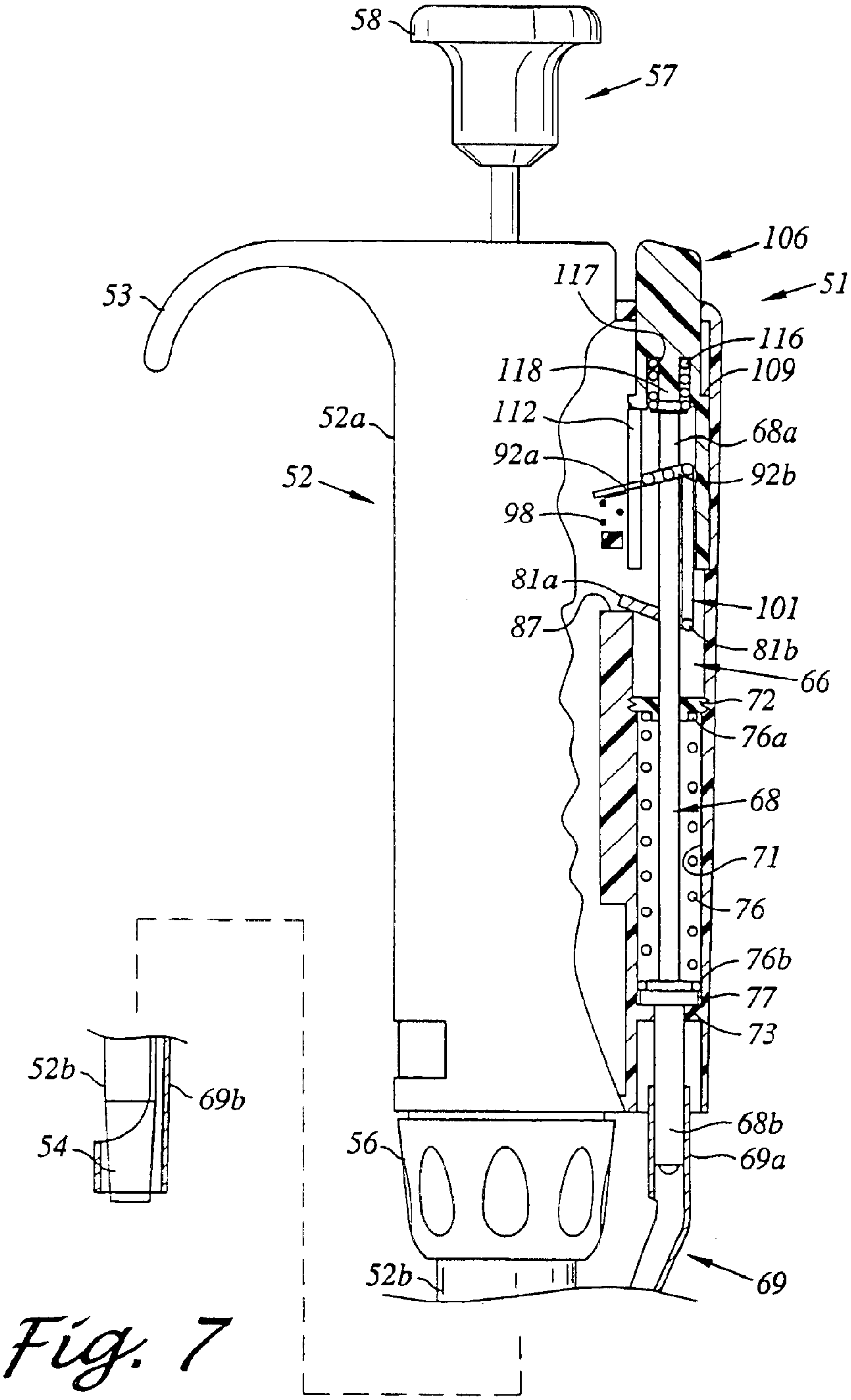
FIG. 7 is a fragmentary and partially cross-sectioned view of the pipette device of FIG. 1 in a third ejection condition following actuation of the eject rod by the eject button.

Ejector 67 is movable in a direction parallel to the longitudinal axis of pipette 51 between a first or upper position for permitting a pipette tip 41 to be securely mounted on shaft distal end portion 54, shown in FIG. 2, and a second or lower position for pushing the pipette tip of off the shaft 52*b*, shown in FIGS. 1 and 7. In this regard, at least a portion of ejector rod 68 is slidably disposed within a cylindrical vertically-extending bore 71 provided in a side of handle 52*a* opposite the finger hook 53. The rod 68 is positioned within the bore 71 and handle 52 by means of an upper rod retainer or bushing 72 and a lower flange 73 which each extend inwardly into the bore 71 so as to vertically receive and guide the rod 68. Movement of ejector 67 to its upper position is limited by the engagement of extension proximal end portion 69*a* with lower flange 73 (see FIG. 2). Compressible spring means or a spring in the form of helical spring 76 is carried within the handle 52*a* of housing 52 and is preferably concentrically disposed about at least a portion of rod 68. Spring 76 may have a spring constant ranging from about 8 to 80 lbs/in and preferably ranging from 12 to 50 lbs/in.

Pipette 51 has means which includes a flange member or collar 77 for compressing the eject spring 76 so as to store energy in the spring. Means is provided for securing the collar 77 to rod 68 and in this regard the collar 77 can be formed integral with the rod 68. Eject spring 76 is disposed between rod retainer or bushing 72 and collar 77 and, more specifically, has a first or upper end portion 76*a* seated against the retainer 72 and a second or lower portion 76*b* seated against the collar 77. Each of the retainer 72 and collar 77 are provided with an annular groove for receiving the respective end portion of eject spring 76. The spring 76 is in a slightly compressed state, as shown in FIG. 7, when ejector 67 is in its lower position. This initial compression inhibits spring rattle. Movement of ejector 67 to its upper position causes eject spring 76 to compress, as shown in FIG. 2. Bushing 72 is removable from housing 52 to permit placement of spring 76 and collar 77 within bore 71 during assembly of pipette 51, yet can be rigidly secured to handle 52*a* so as not to be dislodged during compression of eject spring 76.

Figure 3:
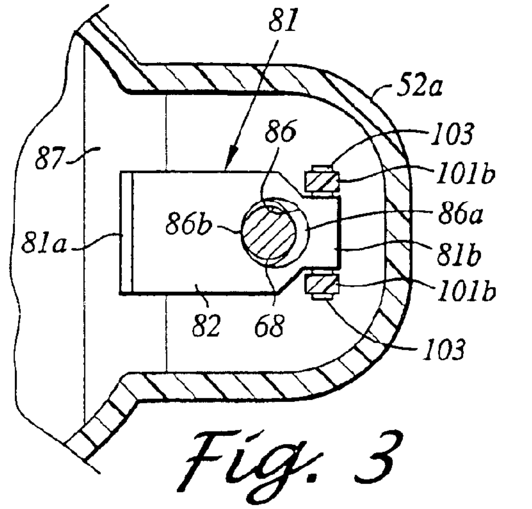
FIG. 3 is a cross-sectional view of the pipette device of FIG. 1 taken along the line 3—3 of FIG. 2.
Figure 9:
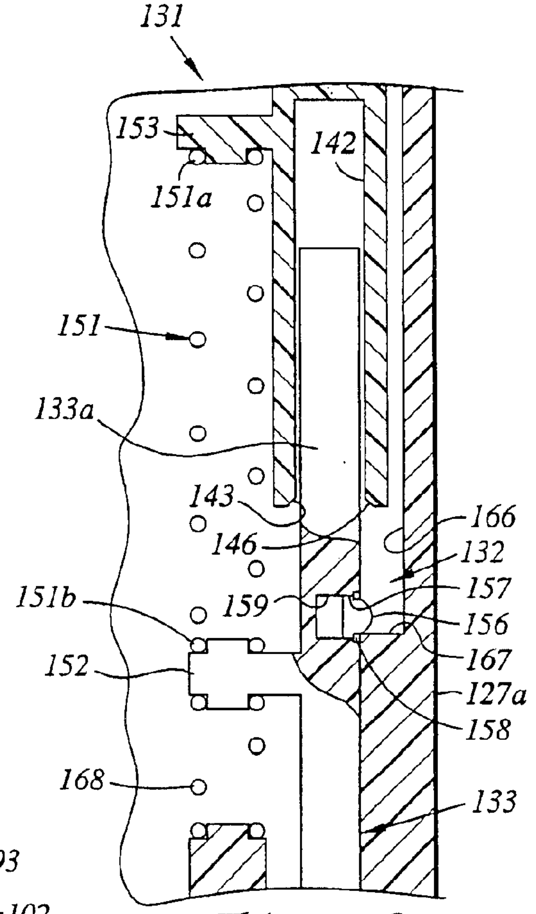
FIG. 9 is an enlarged cross-sectional view of the pipette device of FIG. 8 taken along the line 9—9 of FIG. 8.
Figure 4:
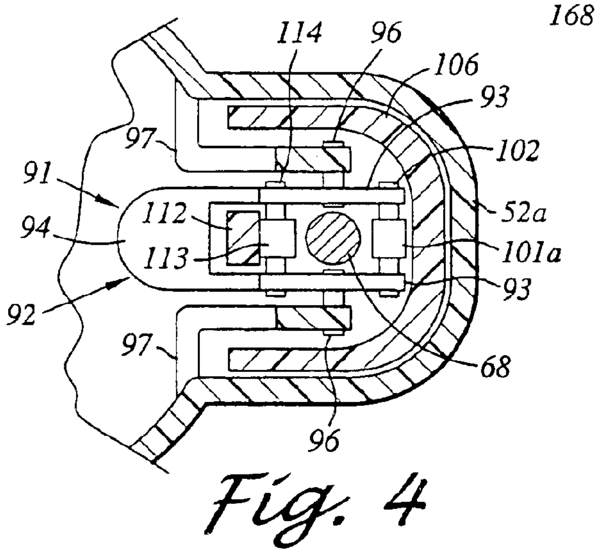
FIG. 4 is a cross-sectional view of the pipette device of FIG. 1 taken along the line 4—4 of FIG. 2.

The ejector assembly 66 includes locking means carried by housing 52 for retaining eject spring 76 in its compressed position (see FIGS. 1–3). A plate member or friction brake member 81 is included within the locking means and has first and second end portions 81*a* and 81*b*. The brake member or brake 81 has a first or upper planar surface 82 and a second or lower planar surface 83 extending parallel to surface 82 and is provided with a circular-shaped bore 84, shown in FIG. 5, formed by an inner cylindrical surface 86 extending perpendicularly between the upper and lower surfaces 82 and 83. Pipette housing 52 has an internal ledge 87 upon which the first or free end portion 81*a* of the brake sits. Brake 81 is pivotable about ledge 87 between a first or unlocked position shown in FIGS. 5–7 for permitting rod 68 to move freely in either an upward or downward direction relative to brake 81 and housing 52 and a second or locked position shown in FIGS. 1 and 2 in which the brake 81 restricts the rod 68 from moving in its locked position, diametrically opposed portions 86*a* and 86*b* of inner surface 86 frictionally engage the outer surface of rod 68 for restricting downward movement of the rod relative to the brake (see FIGS. 2 and 3).

The ejector assembly 66 further includes release means for releasing brake 81 relative to rod 68. The release means, preferably in the form of finger actuatable means, includes a release means or assembly 91 for pivoting brake 81 between its locked and unlocked positions relative to ledge 87 (see FIGS. 1, 2 and 4). A U-shaped member 92 having first and second arms 93 extending in parallel spaced-apart positions from a plate portion 94 is included within release assembly 91. Arms 93 extend along opposite sides of rod 68 and are spaced form the rod so that the rod 68 is movable upwardly and downwardly between arms 93 free of U-shaped member 92. U-shaped member 92 is pivotably carried within handle 52 by means of first and second pins 96 extending along a pivot axis disposed perpendicularly of rod 68. Each of the pivot pins 96 has a first or inner end pivotably secured by any suitable means to one of arms 93 and a second or outer end secured to housing 52 by one of first and second L-shaped brackets or any other suitable means (see FIG. 4). Each of the brackets 97 has a first end portion joined to the inside of handle 52*a* and a second end portion that extends alongside the respective arm 93. Pivot pins 96 permit U-shaped member 92 to pivot between a first or home position, shown in FIGS. 1 and 2, in which the U-shaped member extends perpendicularly of rod 68 and a second or actuated position, shown in FIGS. 5–7, in which the U-shaped member is disposed at an oblique angle relative to the rode 68. Means in the form of a second spring 98 is included within release assembly 91 for urging U-shaped member 92 to its home position. Second or return spring 98 has a first or upper end portion which seats against the underside of plate portion 94 and a second or lower end portion which seats in a annular recess provided in housing 52. The return spring 98 is preloaded so as to be partially compressed when U-shaped member 92 is in its home position. Movement of the U-shaped member to its actuated position results in axial compression of the spring 98.

A Y-shaped linking member or link 101 made from metal or any suitable material serves to secure U-shaped member 92 to brake 81 (see FIGS. 1–4). The link 101 has a first or upper end portion 101*a* which extends between arms 93 and is pivotably secured to the arms 93 by means of a pivot pin 102 extending through link upper end portion 101*a* and each of the arms 93 (see FIGS. 1 and 4). Link 101 has a distal end portion in the form of first and second spaced-apart distal arms 101*b* which extend from the upper portion 101*a*. The distal arms 101*b* extend along each side of the second end portion 81*b* of the brake 81 and are pivotably secured to the brake by means of one or more pivot pins 103 secured to the link 101 and brake 81 in a conventional manner (see FIGS. 1 and 3). The rigid link 101 causes brake 81 to move to its second or release position when U-shaped member 92 is moved to its second or actuated position (see FIG. 5). Conversely, return of the U-shaped member 92 to its first home position, under the force of return spring 98, results in the movement of brake 81 to its first or locked position about ejector rod 68 (see FIGS. 1 and 2). Brake 81 and U-shaped member 92 are each made form any suitable material such as metal.

The finger actuatable means of ejector assembly 66 has a finger operable button 106 made from plastic or any other suitable material slidably carried by housing handle 52*a* (see FIGS. 1 and 2). The button 106 has an inclined upper surface 107, which is engageable by the thumb of the user's hand to depress and thus operate the button, and extends through an opening 108 provided in the top surface of the housing 52. Button 106 is movable from its disengaged or home position, shown in FIGS. 1 and 2, to a first actuation or tip ejection position for releasing brake 81, shown in FIG. 5, and to a second actuation or tip ejection position for manually depressing rod 68, shown in FIG. 7. An annular surface 109 on the button 106 engages housing 52 for limiting the upward movement of the button 106 relative to the housing 52.

Button 106 includes a depending portion or cam member 112 that extends downwardly into housing 56 along one side of proximal end portion of 68*a* for moving U-shaped member or cam follower 92 from its home position to its actuated position. The strip-like cam member or cam 112, shown in cross section in FIG. 4, engages a roller 113 disposed between first and second arms 93 of cam follower 92. Roller 113 is pivotably connected to arms 93 by means of a pin 114 having opposite end portions secured to respective arms 93 in a conventional manner. Means in the form of a return spring 116 is provided for urging button 106 to its home or disengaged position shown in FIGS. 1 and 2. The return spring 116 has a first or upper end portion seated within an annular recess 117 provided in the underside of button 106 and a second or lower end portion seated in an annular recess provided atop the proximal end portion 68*a* of rod 68. Plate portion 94 of cam follower 92 pivots downwardly or counterclockwise with roller 113 against the force of return spring 98 causing link 101 secured to arms 93 to move upwardly and thus pivot brake 81 counterclockwise in FIG. 5 to its disengaged position. Once roller 113 has pivoted towards rod 68 to a point where cam 112 is tangential to the outer cylindrical surface of the roller, further depression of button 106 causes cam 112 to rollably engage the roller 113 and not further pivot plat portion 94 downwardly. Annular recess 117 defines a post 118 depending from the center of button 106 which facilitates retention of the upper end portion of spring 116 within button 107.

In operation and use, a pipette tip 41 is mounted on distal end portion 54 of housing 52 in a conventional manner. For example, the user grasps housing handle 52*a* and directs the distal end portion 54 into proximal opening 43 of a pipette tip 41. The tip 41 is typically seated in a tip rack vertically supporting a plurality of pipette tips. The user presses downwardly on the handle 52*a* with his or her arm and shoulder muscles to force the distal end portion 54 into tip proximal end 41*a* until a suitable press fit between the tip 41 and pipette 51 is provided for retaining the tip on the pipette. During this mounting step, tip proximal end 41*a* engages extension collar 69*b* to move ejector 67 upwardly relative to housing 52 form the first or lower position of ejector 67, shown I FIG. 1, to the second or upper position of the ejector, shown in FIG. 2. Such retraction of ejector 67 into housing handle 52*a* causes eject spring 76 to compress and thus store as potential energy a portion of the force utilized to mount pipette tip 41 onto pipette 51. As previously described, the ejection spring 76 is retained in its compressed condition by the locking means, which includes brake 81.

Figure 5:
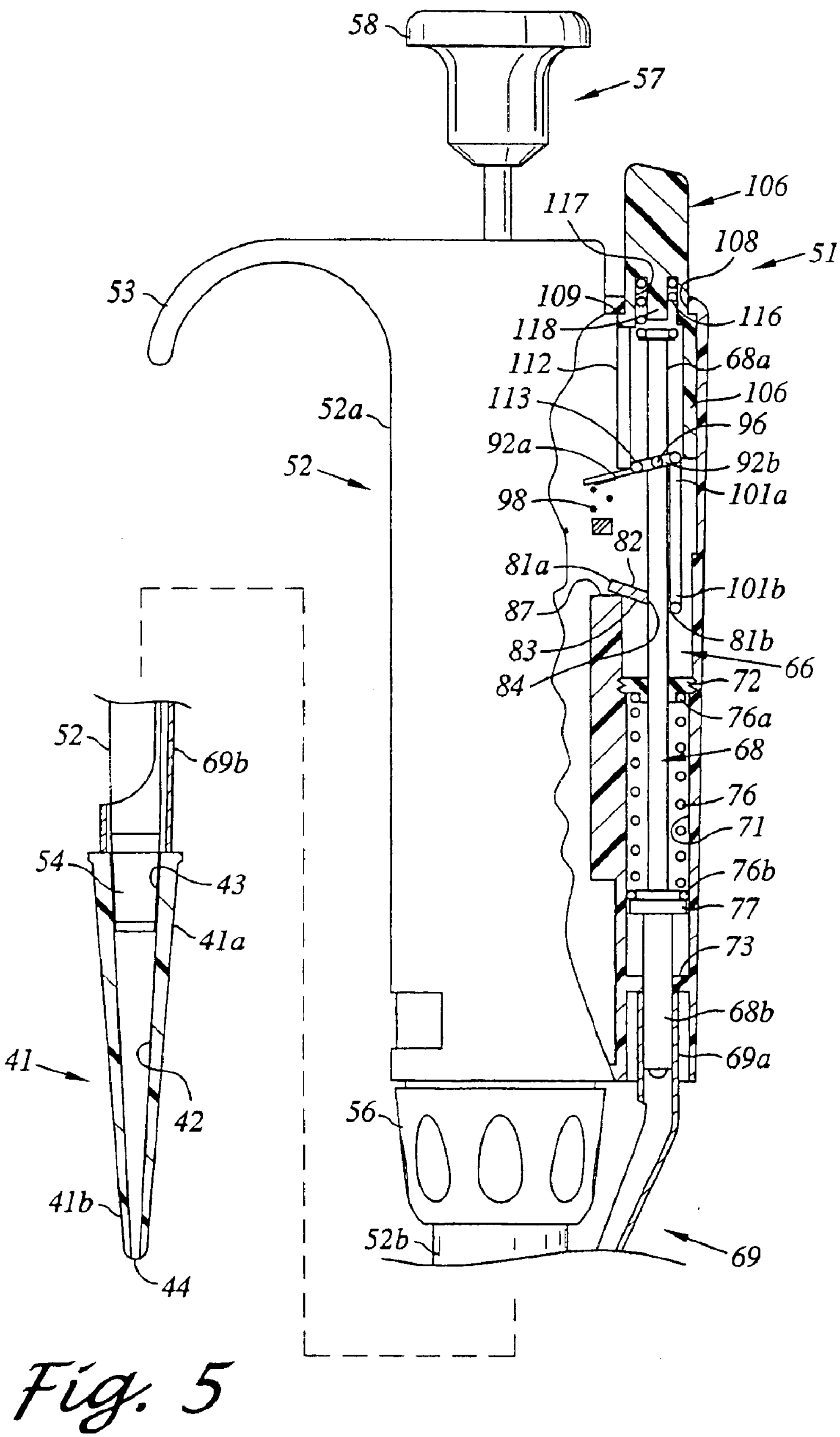
FIG. 5 is a fragmentary and partially cross-sectioned view of the pipette device of FIG. 1 in a first tip ejection condition following actuation of an eject button.
Figure 6:
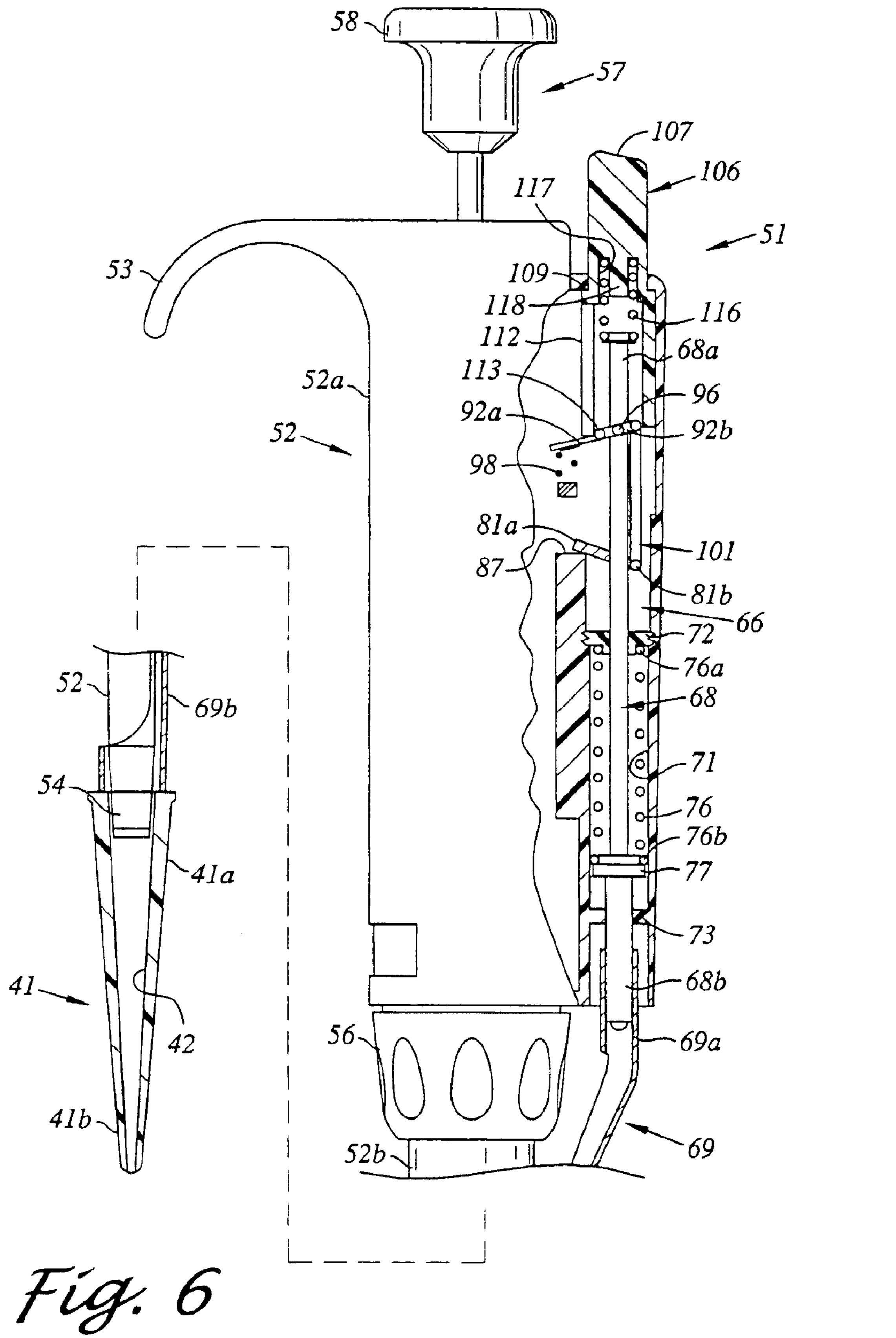
FIG. 6 is a fragmentary and partially cross-sectioned view of the pipette device of FIG. 1 in a second ejection condition following release of an eject rod.

After pipette 51 and tip 41 have been utilized by the user to aspirate and dispense liquid in a conventional manner, the tip 41 can be removed from distal end portion 54 by the user pressing downwardly on button 106 with his or her thumb. In the first step of the tip ejection sequence, as discussed above, the downward movement of button 106 relative to housing 52 causes cam 112 to engage cam follower 92 to release brake 81 and permit ejector 67 to move downwardly in housing handle 52*a* under the force of the released ejection spring 76. FIG. 5 depicts button 106 in its first actuation or partially depressed position where plate portion 94 of the cam follower 92 has been depressed so as to cause brake 81 to pivot upwardly or counterclockwise and release ejector 67. In the second step of the tip ejection sequence, ejector 67 is forced downwardly in housing handle 52*a* under the force of the eject spring 76 from its fully retracted position, shown in FIG. 5, to an extended or lower position, shown in FIG. 6. Such downward movement of ejector 67 causes rod distal end portion 68*b* to move pipette tip 41 downwardly on shaft distal end portion 54. During the tip ejection sequence, button 106 is continually urged upwardly relative to handle 52*a* by return spring 116.

Normally, the stored energy and force from eject spring 76 is sufficient to push the pipette tip 41 off of the shaft 52*b*. If the pipette tip 41 has not been fully pushed off shaft distal end portion 54 by the force of eject spring 76, the user can further depress button 106 so as to cause center post 118 of the button to engage proximal end portion 68*a* of rod 68 and thus manually move the rod further downwardly from its position in FIG. 5 or FIG. 6 until collar 77 engages housing lower flange 73. As discussed above, cam 112 rollably engages roller 113 during this further depression of button 106. Collar 77 limits the downward movement of the ejector 67 within housing 52. When the collar 77 engages flange 73, ejector 67 is in its lowermost position relative to housing 52. Following ejection of pipette tip 41, the user releases button 106 which results in return spring 116 causing the button to move upwardly through the opening g 108 to a fully extended or home position shown in FIG. 1.

As can be seen, ejector assembly 66 permits a portion of the energy utilized to mount the pipette tip 41 on pipette 51 to be stored within eject spring 76 for later use in ejecting the pipette tip from the pipette. Such stored energy, typically provided by the arm and shoulder muscles of the user, decreases the amount of force exerted by the user on button 106 during the tip ejection sequence, thus reducing the risk of repetitive stress injuries to the user's thumb, wrist an/or fingers.

It should be appreciated that other embodiments of the present invention can be provided. For example, another embodiment of a pipette device or pipette 126 having a tip ejector utilizing stored energy for use with a tip 41 is shown I FIGS. 8–12. Pipette 126 therein is substantially similar to pipette 51 and like reference numerals have been used to describe like components of pipettes 126 and 51. Pipette 126 has a housing 127 substantially similar to housing 52 and is provided with a first extremity or handle portion 127*a* and a second extremity or shaft 52*b*. An ejector assembly 131 is carried by the housing 127 for pushing tip 41 off of the distal end of the shaft 52*b* and includes an eject spring 151 which is compressed by a user when the user depresses an eject button 137. The ejector assembly further includes release means actuatable by the user to release an ejector 132 that is accelerated by the eject spring to impact the tip 41 and thus provide an initial impact force for pushing the tip 41 off of the distal end of the shaft 52*b*.

Ejector assembly 131 has similarities to ejector assembly 66. Ejector mechanism or ejector 132 is included within ejector assembly 131 and has a first extremity of rod 133 and a second extremity or extension 134. The eject rod 133 is substantially cylindrical in shape and has a first or proximal end portion 133*a* and a second or distal end portion 133*b*. Extension 134 is substantially identical to extension 69 and has a first or proximal end portion 134*a* and a second or distal end portion 134*b*. The proximal end portion 134*a* of the extension is concentrically mounted about distal end portion 133*b* of rod 133. The distal end portion or collar 134*b* of the extension is circumferentially disposed about shaft distal end portion 54 for vertical movement thereon. Rod 133 and extension 134 are each made from any suitable material such as metal.

Figure 8:
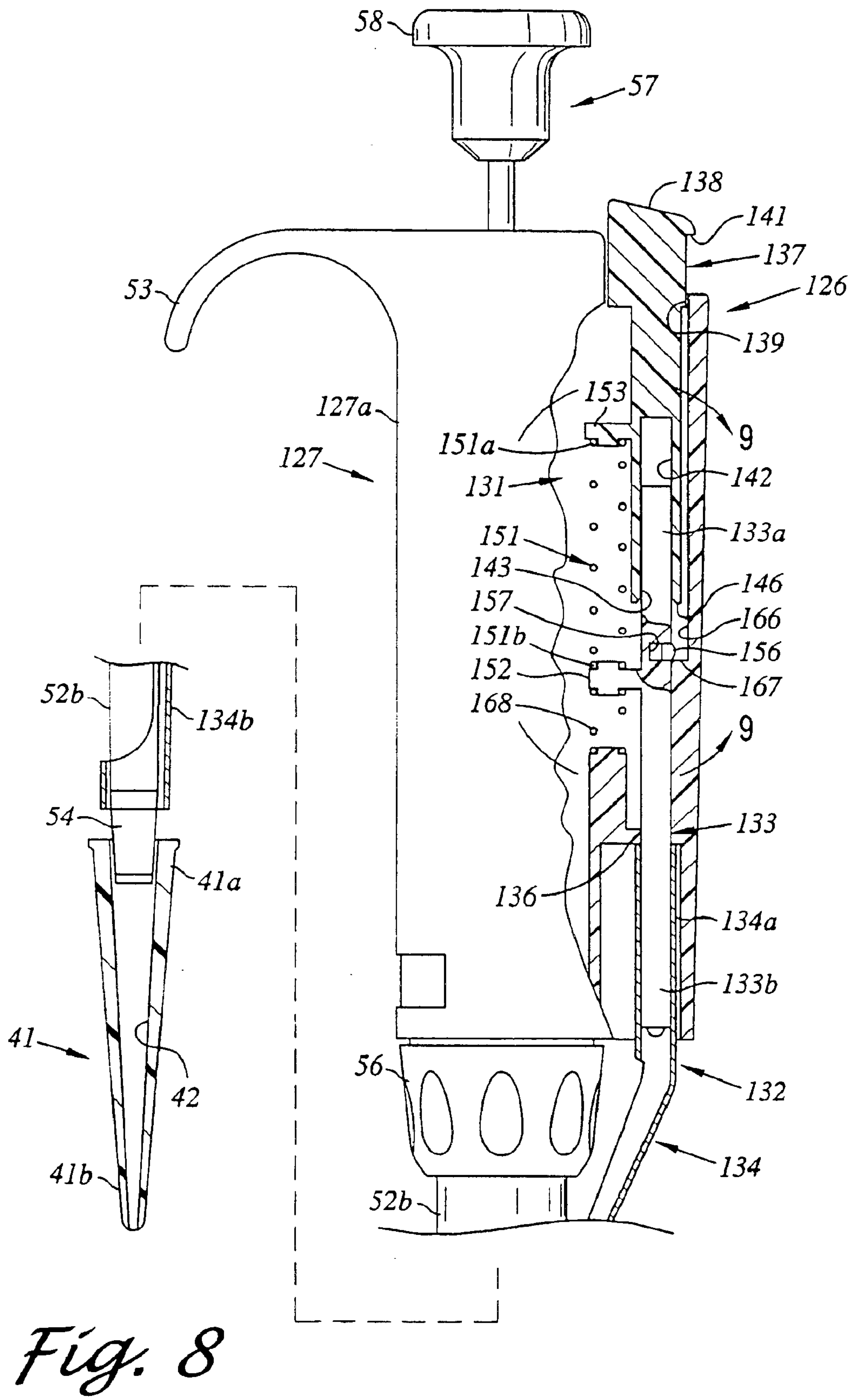
FIG. 8 is a fragmentary and partially cross-sectioned view of another embodiment of a pipette device with a tip ejector utilizing stored energy in accordance with the present invention, the pipette device having a tip mounted thereon.
Figure 12:
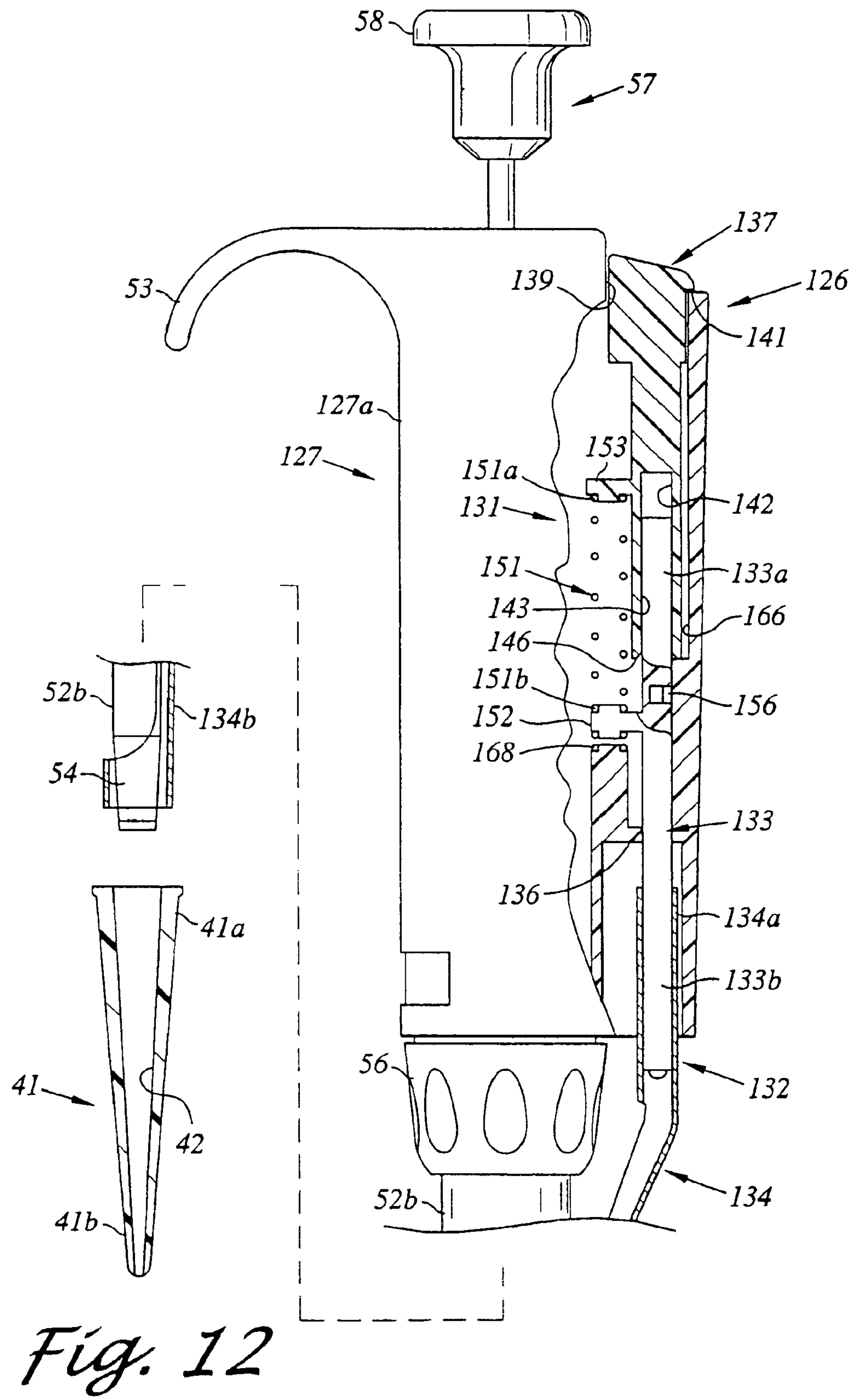
FIG. 12 is a fragmentary and partially cross-sectioned view of the pipette device of FIG. 8 in a second tip ejection condition following release of the lock pin.

Rod 133 is slidably disposed within housing 127 for movement in a direction parallel to the longitudinal axis or centerline of pipette 126. Ejector 132 is longitudinally moveable relative to the housing 127 between a first or upper position for permitting a pipette tip 41 to be securely mounted on shaft distal end portion 54, as shown in FIG. 8, and a second or lower position for pushing the pipette tip off of the shaft distal extremity, as shown in FIG. 12. Housing 127 has a flange 136 which engages and guides 133 during its upward and downward movement within housing 127. The upward movement of ejector 132 is limited by the engagement of extension proximal end portion 134 with the underside of flange 136.

Figure 11:
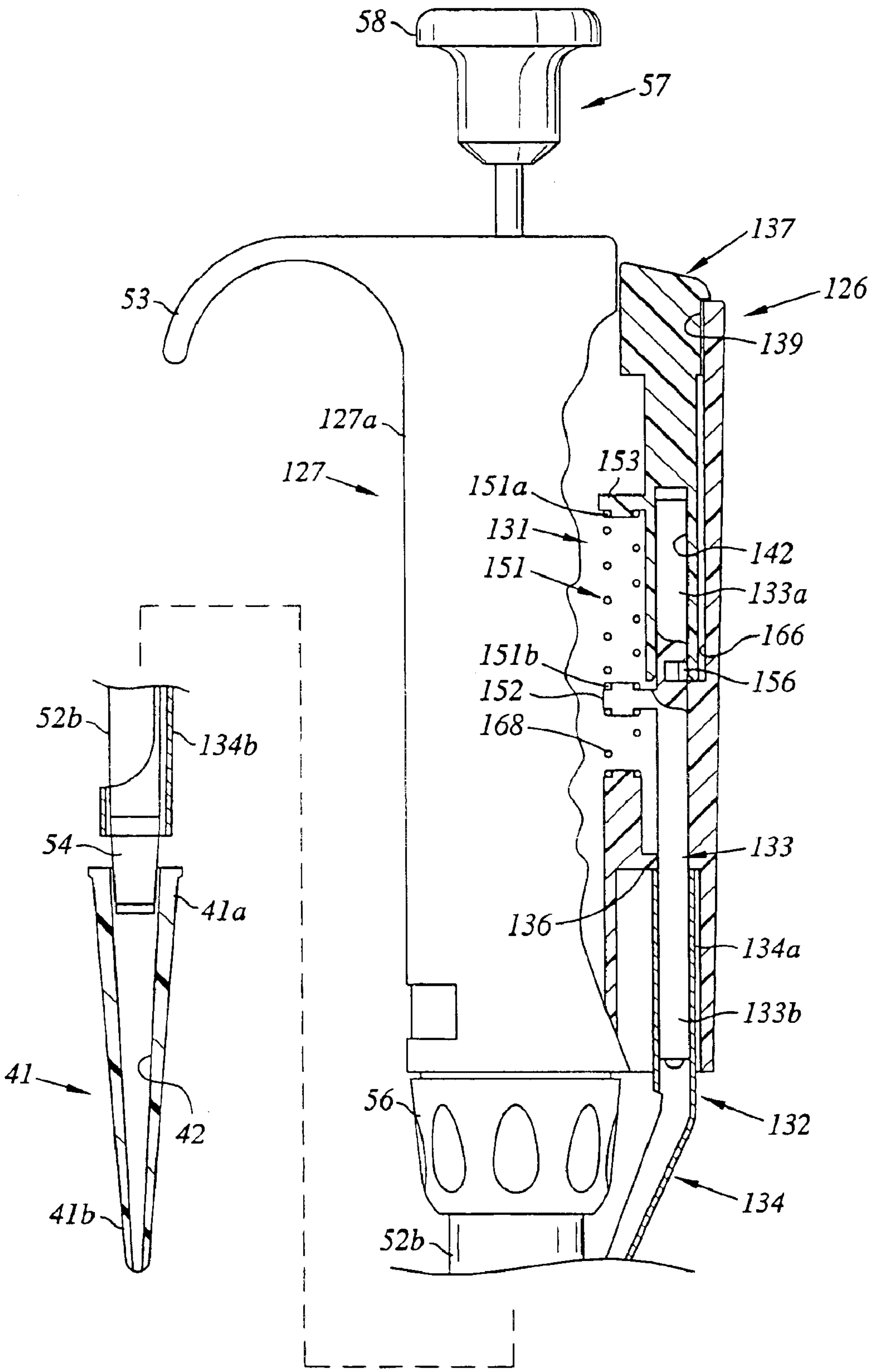
FIG. 11 is a fragmentary and partially, cross-sectioned view of the pipette device of FIG. 8 in a first tip ejection condition following release of the lock pin.

A button 137 is slidably carried by housing 127 for movement in the direction of ejector rod 133 between a first or extended position, shown in FIG. 8, and a second or depressed condition, shown in FIGS. 11 and 12. The button is made form plastic or any other suitable material and has an upper inclined surface 138 for facilitating actuation by the thumb of the user of pipette 126. Button 137 extends upwardly through an opening 139 in the upper surface of housing 127. A lip 141 is provided on button 137 for engaging housing 127 to limit the downward movement of the button into the housing. Button 137 sits atop ejector rod 133 and is provided with a centrally-disposed, longitudinally-extending bore 142 for receiving proximal end portion 133*a* of the rod 133. Bore 142 communicates with an opening 143 at the bottom end of the button and the button is provided with a beveled surface 146 which circumscribes opening 143.

Compressible spring means or spring 151 is carried within housing 127 for storing energy to facilitate removal of pipette tip 41 from pipette 126. Eject spring 151 has a first or upper end portion 151*a* disposed against button 137 and a second or lower end portion 151*b* disposed against ejector rod 133 and may have a spring constant ranging from about 0.15 to 20 lbs/in. and preferably ranging from 0.6 to 3 lbs/in. A flange member or flange 152 is included within the ejector assembly 131 and means is provided for securing the flange 152 integral with the ejector 132. More specifically, the flange 152 is formed integral with rod 133 and extends radially outwardly from one side of rod 133 in a direction perpendicular to the longitudinal axis of the rod. A second flange member or upper flange 153 is included within ejector assembly 131 and extends radially outwardly from one side of the cylindrical button 137 in a direction perpendicular to the longitudinal axis of the button. Spring upper end portion 151*a* is seated within an annular recess provided in the underside of upper flange 153 and spring lower end portion 151*b* is seated within a similar annular recess provided on the top surface of rod flange 152.

Figure 10:
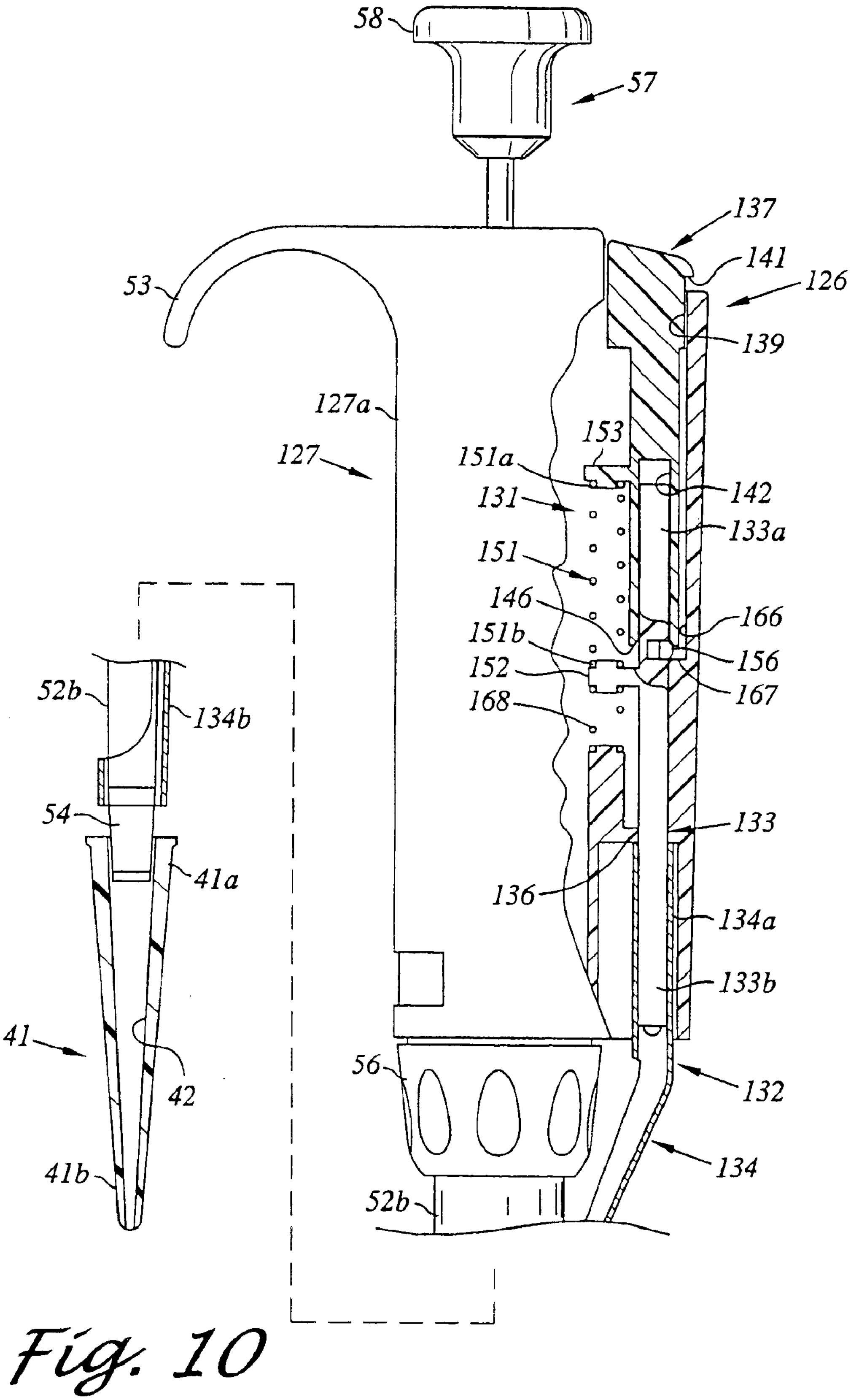
FIG. 10 is a fragmentary and partially cross-sectioned view of the pipette device of FIG. 8 in an energized condition following depression of the eject button.

Button 137 and, more specifically, upper flange 153 thereof are included within the means of pipette 126 for compressing spring 151 so as to store energy in the spring. As shown in FIGS. 8 and 10, depression of button 137 by the user causes the eject spring 151 to compress. Pipette 126 further includes locking means carried by housing 127 for retaining eject spring 151 in its compressed position. Such locking means includes a spring biased pin member of pin 156 carried by ejector rod 133 (see FIGS. 8 and 9). The rod 133 is provided with a radially extending bore 157 for slidably receiving pin 156, which is retained in the bore 157 by any suitable means such as a sleeve 158 that is press fit into the outer cylindrical surface of rod 133. Pin 156 is formed with a flange that engages the sleeve 158 to limit the outward movement of the pin 156 from the rod 133. A helical spring 159 is disposed within bore 157 and engages the rear of pin 156 for urging the pin radially outwardly from the rod. Housing 127 is provided with a recess 166 formed in part by a shelf 167 for receiving the leading end of pin 156. Engagement of the forward end of pin 156 with shelf 167 serves to restrict downward movement of rod 133 within housing 127 and thereby longitudinally lock the rod 133 within housing handle 127*a*.

A second helical spring 168 is included within pipette 126 for urging ejector 132 towards its upper position shown I FIG. 8 against the force of eject spring 151. The eject spring 151 is substantially uncompressed when ejector 132 and button 137 are in their upper position shown in FIG. 8. Reset spring 168 has a first or upper end portion seated with an annular recess provided on the underside of rod flange 152 and a second or lower end portion seated within a similar annular recess provided on housing 127. The reset spring has enough force to lift the eject rod 133 to a height in housing handle 127*a* sufficient for the leading end of locking pin 156 to sit atop retention shelf 167. Eject spring 151 and reset spring 168 are aligned along an axis extending parallel to the longitudinal axis of rod 133. The spring constant of eject spring 151 is greater that the spring constant of reset spring 168 and is preferably considerably greater that the spring constant of reset spring 168.

Pipette 126 has finger actuatable means which includes beveled surface 146 of the button 137 and the inner cylindrical surface forming the bore 142 of the button for releasing the locking means of the pipette. Movement of button 137 from its extended or rest position shown in FIG. 8 to its depressed or actuation position shown in FIG. 11 causes surface 146 and the inner surface forming g bore 142 of the button to force pin 156 radially inwardly into rod 133. Such retraction of pin 156 releases ejector 132 from its locked position within housing 127.

In operation and use, pipette tip 41 is mounted onto distal end portion 54 of pipette 126 in the same manner as discussed above. The force for mounting tip 41 to pipette 126 ins less than the mounting force required in pipette 51 because eject spring 151 is not compressed in this mounting step of pipette 126. Extension 134 of the ejector 132 is sized so that extension collar 134*b* is spaced above the proximal end 41*a* of the pipette tip when the tip is press fit or otherwise suitably secured to the pipette. This separation or acceleration gap between pipette tip 41 and extension collar 134*b* may range form about 0.1 to 0.5 inch and is preferably approximately 0.3 inch. During mounting of pipette tip 41 to pipette 126, ejector 132 is locked in it uppermost position by means of locking pin 156.

After pipette tip 41 is utilized in a desired aspiration and dispensing procedure, a tip ejection sequence is initialized by the user placing his or her thumb on inclined surface 138 of button 137 and depressing the button into the housing opening 139. During the first portion of the downward stroke of button 137, illustrated by the change in position of button 137 from FIG. 8 to FIG. 10, eject spring 151 is compressed. Further depression of button 137 causes beveled surface 146 to engage pin 156 and the inner surface of bore 142 to urge the pin inwardly into bore 157 so as to release ejector 132, as shown in FIG. 11. The ejector 132 is subsequently accelerated under the force of eject spring 151 a distance equal to the initial separation gap between pipette tip 41 and extension collar 134*b*. The accelerated extension 134 impacts proximal end 41*a* of the pipette tip 41 to provide an initial ejection force on the pipette tip 41 sufficient to overcome the static friction force retaining tip 41 on shaft distal end portion 54. The user retains his or her thumb on button 137 during the acceleration of ejector 132 so as to maximize the force of eject spring 151 on ejector 132. Following such initial impact, ejector 132 continues downwardly under the force of eject spring 151 until pipette tip 41 is pushed off shaft distal portion 54 (see FIG. 12).

Upon removal of the pipette tip 41 from pipette 126, the user releases button 137 so as to permit eject spring 151 to become fully expanded and no longer exert any downward force. The compressed return spring 168 now pushes ejector 132 upwardly to its uppermost or home position shown in FIG. 8, where pin 156 snaps back over shelf 167 to lock the ejector 132 in its home position.

The acceleration of ejector 132 across the separation gap between extension collar 134*b* and pipette proximal end 41*a* develops a momentum in the ejector 132 which in turn creates a peak ejection force upon impact that, for a given spring constant, is greater than the ejection force created by a pipette, such as pipette 51, which does not utilize an acceleration or separation gap. Such acceleration and subsequent impact overcome the static retention force to commence removal of the tip 41 from pipette 126 and permit eject spring 151 to have a lower spring constant than the eject spring in a similar pipette which does not utilize such a separation gap. Pipette 126 permits peak forces on the user's thumb to be reduced by more than an order of magnitude. Such forces can be limited to only a pound or two even though a tip 41 may require up to 20 pounds of force to commence movement of the tip down the pipette shaft 52*b*.

The acceleration of a mass to create the initial ejection force, as utilized I pipette 126, additionally provides for an efficient tip ejection system in that the stored energy in spring 151 only needs to be slightly more than the energy required to remove the tip 41 form the pipette 126. In this regard, the spring constant of the reset spring 168 is weak compared to the force of the compressed eject spring 151 such that only a small portion of the potential energy stored in the eject spring is transferred to the reset spring 168 as the reset spring is compressed. Additionally, if the energy stored in eject spring 151 is less than that required to completely dislodge a tip 41, a user only needs to fully release the button 137 so as to reset the ejector 132 and perform a second impact on the tip. Most of the stored energy is transferred to the tip moving it further down shaft distal end portion 54 on each impact. Impacts are cumulative so that a tip having a high frictional retention force can be hammered off of shaft 52*b* with multiple impacts form the ejector 132.

A further embodiment of a pipette utilizing stored energy is shown in FIGS. 13–17. The pipette 181 illustrated therein is substantially similar to pipette 51 and like reference numerals have been used to describe like components of pipettes 181 and 51. Pipette 181 is for use with tip 41 and has a housing 182 substantially similar to housing 52. A first extremity or handle portion 182*a* having a size and shape the same as housing 52*a* of pipette 51 and a second extremity or shaft 52*b* are included within housing 52. An ejector assembly 186 is carried by the housing for pushing tip 41 off the distal end of the shaft 52*b* and includes an eject spring 216 which is compressed by a piston 218 under the force of an ejector 187 when a user mounts a tip 41 onto the distal end portion of the shaft 52*b*. The ejector assembly further includes release means actuatable by the user to release the piston 218 relative to the ejector 187. The piston is driven by the compressed eject spring 216 across an acceleration gap to impact a surface of the ejector 187 and cause the ejector to then push the tip 41 off of the distal end of the shaft 52*b*.

The ejector assembly 186 includes an ejector mechanism or ejector 187 having a first extremity or rod 188 and a second extremity or extension 69. The eject rod 188 is substantially cylindrical in shape and has a first of proximal end portion 188*a* and a second or distal end portion 188*b*. Rod 188 is made from metal or any other suitable material. Extension proximal end portion 69*a* is secured to rod distal end portion 188*b* in the manner discussed above with respect to pipette 51.

Housing handle 182*a* is provided with a vertically-extending bore extending along an axis parallel to the longitudinal axis of pipette 181 for slidably receiving rod 188. A flange 192 extends inwardly into bore 191 to slidably engage the guide rod 188 and divide the bore into an upper portion 191*a* and a lower portion 191*b*. Rod 188 is formed with an integral collar 193 having an annular, upper surface 194 which serves as an impact surface. Ejector 187 is vertically movable in a direction parallel to the longitudinal axis of the pipette 181 between a first or upper position, shown in FIG. 14, for permitting pipette tip 41 to be mounted to shaft distal end portion 54 and a second or lower position, shown in FIG. 13, for pushing the pipette tip off of the shaft 52*b*. The engagement of collar 193 with flange 192 limits the downward movement of rod 188 and thus ejector 187 relative to housing 182.

Locking means is included within pipette 181 for locking ejector 187 in its upper most position. Such locking means includes a plate member or friction brake member 198 which is substantially similar to brake 81 and made from metal or any other suitable material. The brake member or brake 198 extends through an internal opening 199 provided in housing wall 200 and has a first end portion 198*a* disposed in bore lower portion 191*b* and an opposite second end portion 198*b* disposed inside housing 182 alongside the bore 191. Brake 198 pivotably rests upon a ledge 201 formed in the internal wall 200 and created by the opening 199 in the wall 200. A bore 202 extends perpendicular between the upper and lower planar surfaces 203 and 204 of brake 198. The circular-shaped bore 202 is substantially similar to bore 84 discussed above and is formed by an inner surface 20*g* having braking portions 206*a* and 206*b* for frictionally engaging rod distal portion 188*b* when ejector 187 is in its upper position shown in FIG. 14. The brake 198 is pivotable upon ledge 201 between its first or locked position of FIG. 14, for restricting downward movement of rod 188 within housing 182, and its second or unlocked position shown in FIG. 13, for permitting such downward movement of the rod. Rod 188 can move upwardly through bore 202 when brake 198 is in either of its locked or unlocked positions. A helical spring 207 is provided in housing 182 for urging brake 198 towards its locked position. Brake spring 207 has a first or upper end portion seated about a semi-spherical protuberance 208 formed on the bottom of brake second end portion 198*b* and a second or lower end portion extending over a stud 209 extending upwardly from the bottom wall of housing handle 182*a*.

Compressible spring means or spring 216 is carried within housing 182 and included within ejector assembly 186. The eject spring 216 has a first or upper end portion 216*a* disposed against housing 182 and a second or lower end portion 216*b* concentrically disposed about a portion of rod 188 and coupled to the ejector 187. An annular recess 217 is provided in the upper portion of housing 182 for seatably receiving spring end portion 216*a*. Spring 216 may have a spring constant ranging from about 0.1 to 20 lbs/in and preferably ranging form 0.5 to 2 lbs/in.

Figure 13:
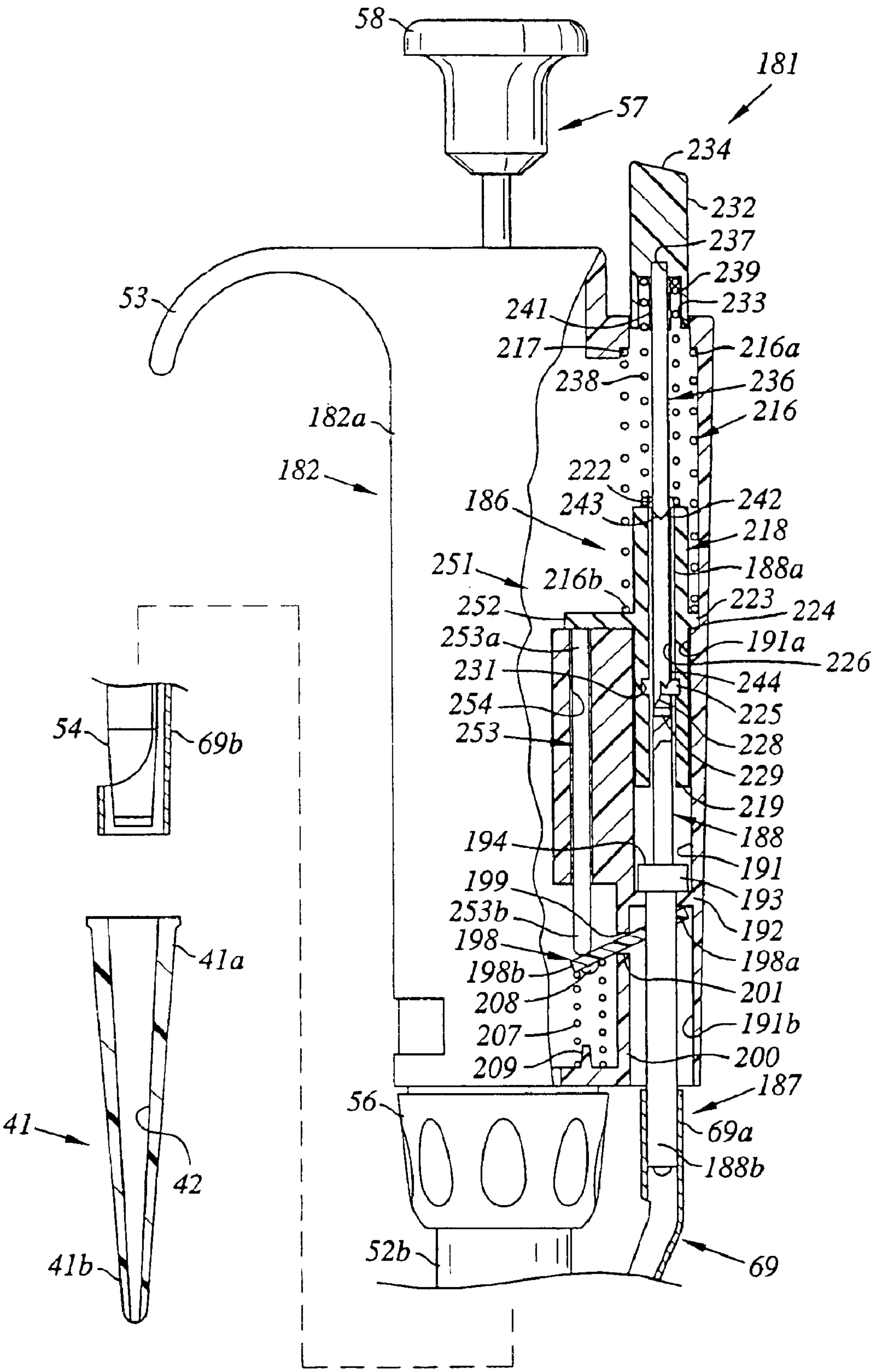
FIG. 13 is a fragmentary and partially cross-sectioned view of another embodiment of a pipette device with tip ejector utilizing stored energy in accordance with the present invention, the pipette device having no tip mounted thereon.
Figure 14:
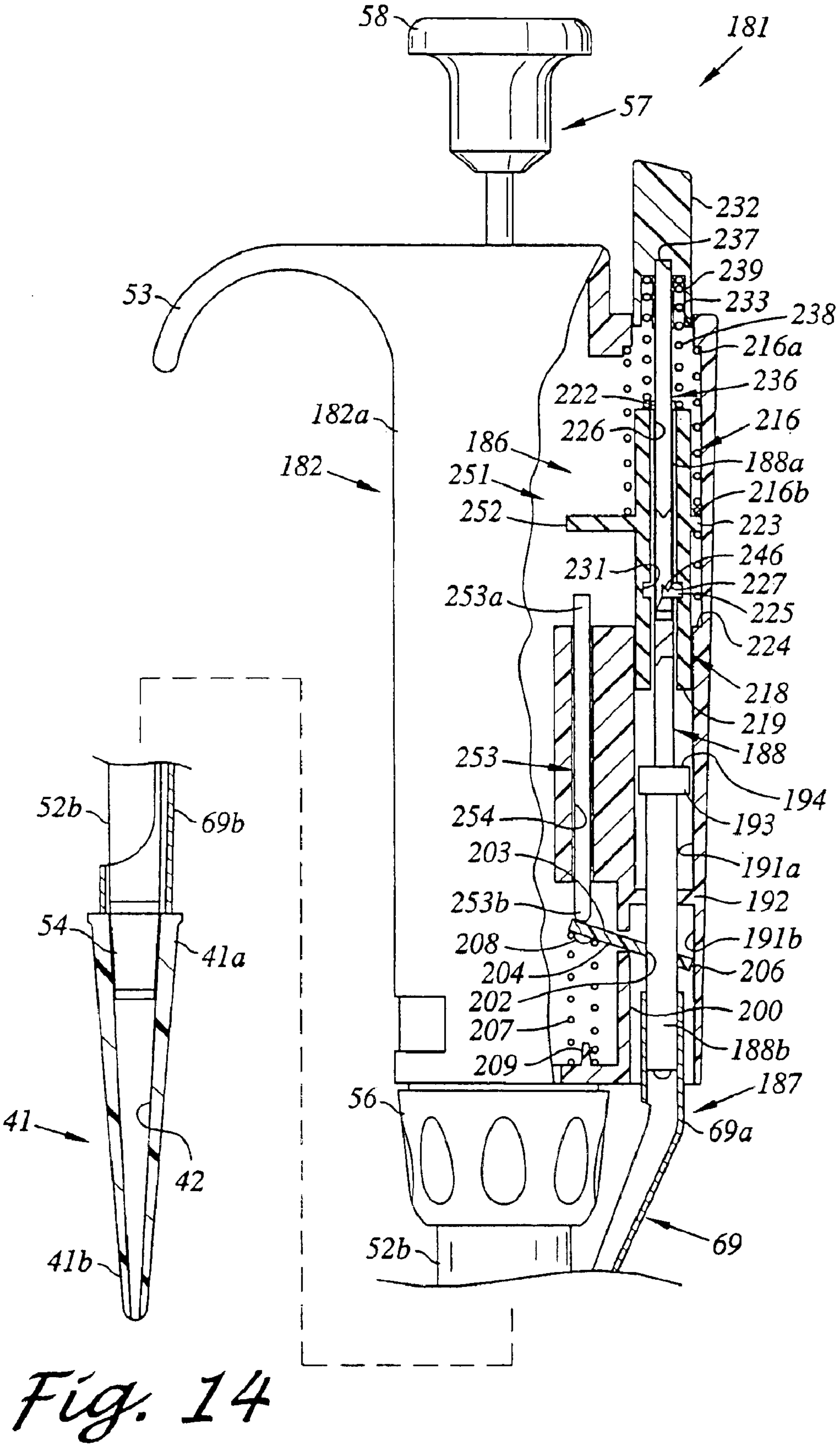
FIG. 14 is a fragmentary and partially cross-sectioned view of the pipette device of FIG. 13 with a disposable tip mounted on the shaft of the pipette device.
Figure 16:
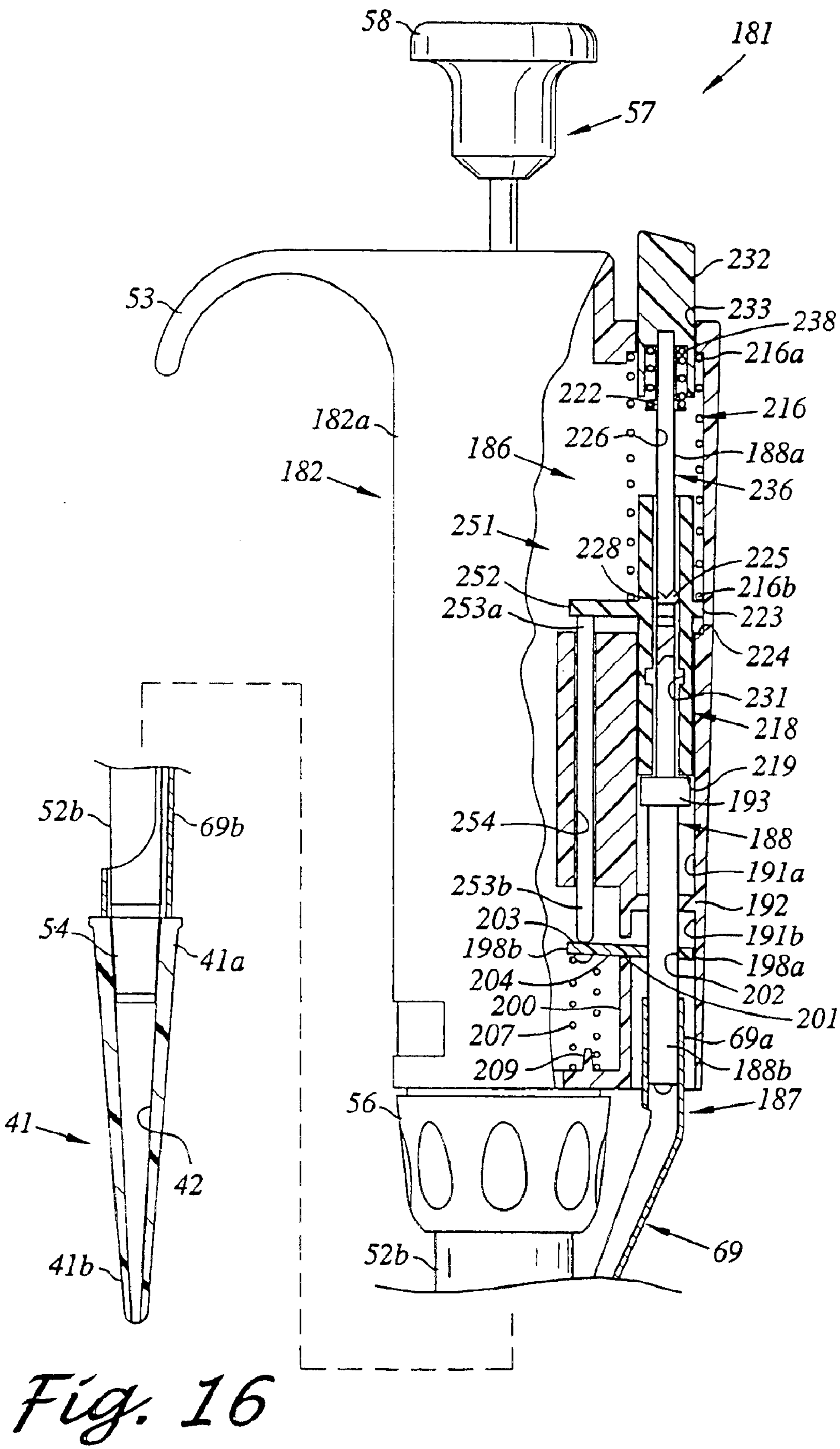
FIG. 16 is a fragmentary and partially cross-sectioned view of the pipette device of FIG. 13 in a second ejection condition following disengagement of the eject rod.
Figure 17:
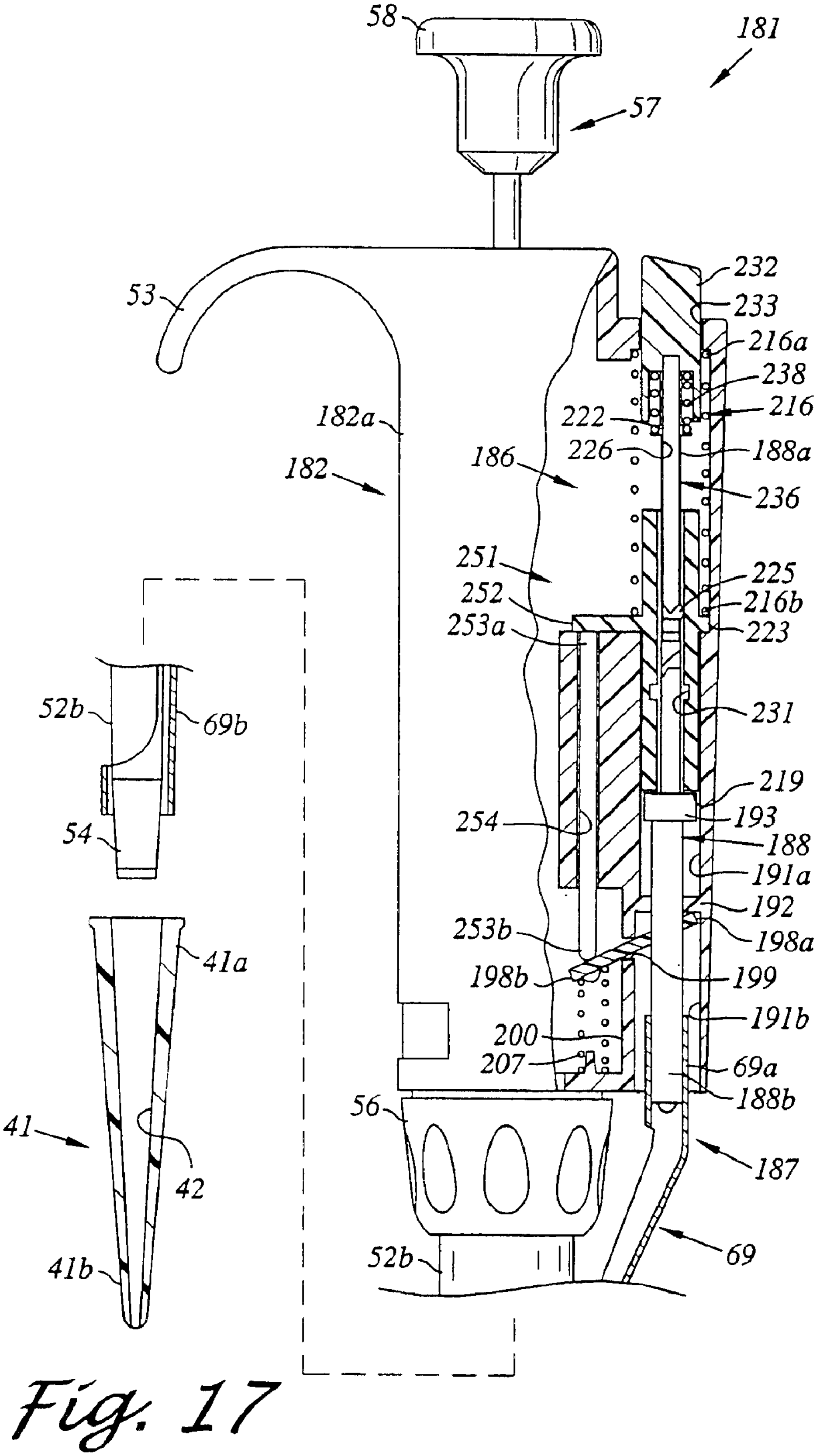
FIG. 17 is a fragmentary and partially cross-sectioned view of the pipette device of FIG. 13 I a third ejection condition following manual actuation of the eject rod by the eject button.

A piston member 218 is included within the means of pipette 181 for compressing eject spring 216 so as to store energy in the spring 216 for facilitating removal of a pipette tip 41 mounted to shaft distal end portion 54. Preferably, the piston 218 is tubular, made from metal or any other suitable material and has a lower surface 219. The piston 218 is longitudinally moveable on rod 188 between a first or upper position in which lower surface 219 is spaced apart from impact surface 194, as shown in FIG. 14, and a second or lower position relative to rod 188 in which the piston is in contact with collar 193, as shown in FIG. 16. The distance between piston lower surface 219 and collar impact surface 194 when the piston 218 is in its upper position is referred to herein as the acceleration gap and may range from about 0.1 to 0.5 inch and is preferably approximately 0.6 inch. An annular lip 222 is formed at the tip of rod 188 for limiting the upward movement of piston 218 relative to the rod. Spring lower end portion 216*b* is concentrically disposed about the upper portion of piston 218 and seats against an annular external flange member or flange 223 formed integral with the piston. The upward movement of rod 188 or piston 218 within housing 182 causes flange 223 to compress eject spring 216. A ledge 224 is provided in housing handle 182*a*. The underside of piston flange 223 engages the ledge 924, as shown in FIG. 13, to limit the downward movement of the piston 218 within housing 182 during movement of rod 188 to its lower position.

Figure 15:
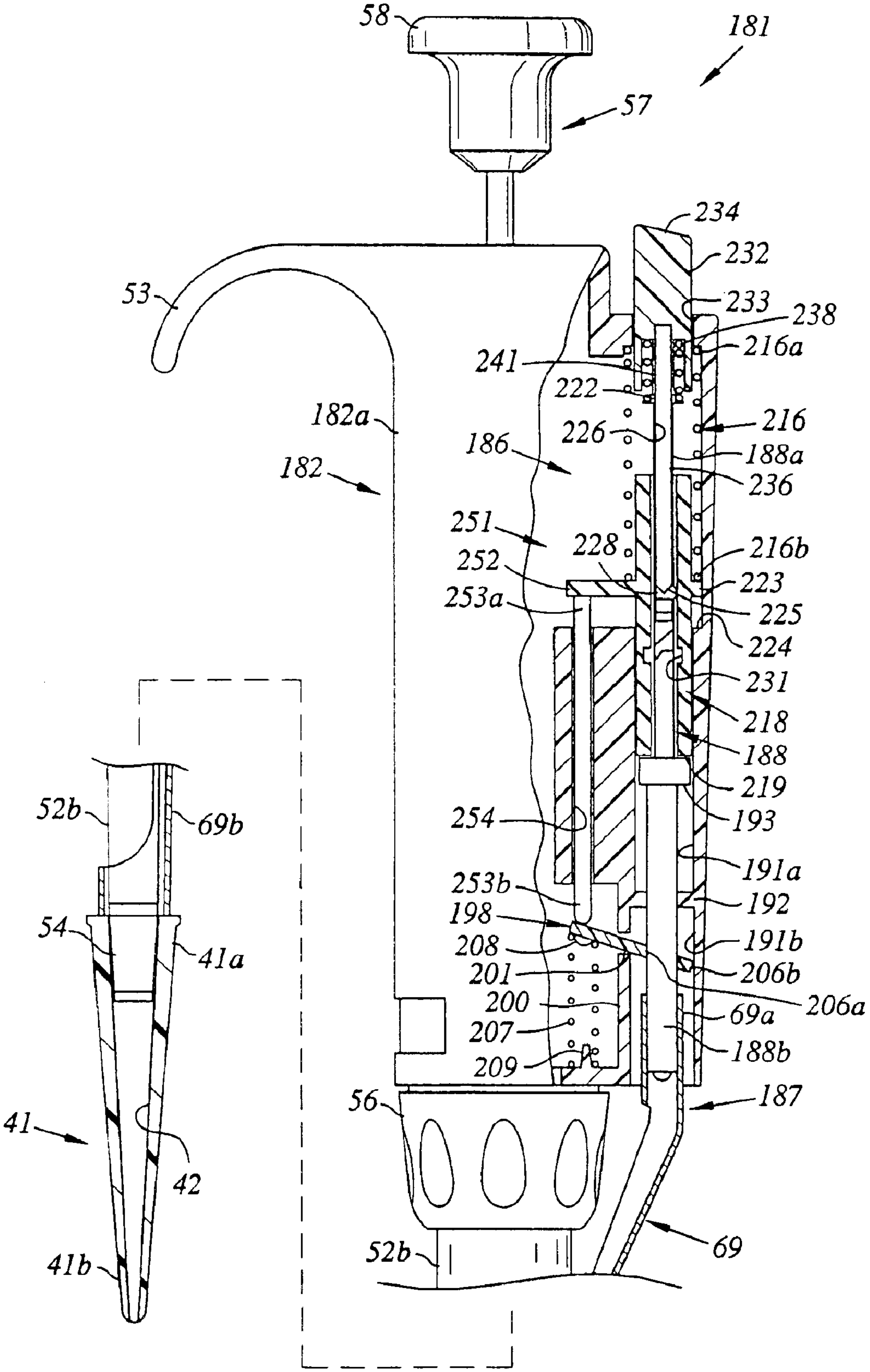
FIG. 15 is a fragmentary and partially cross-sectioned view of the pipette device of FIG. 13 in a first tip ejection condition following actuation of the eject button and release of the lock pin.

Secondary or additional locking means is included within pipette 181 for retaining eject spring 216 in it compressed position. Such locking means can be in the form of a spring biased pin 225 which serves to retain piston 218 in its upper position relative to rod 188. The rod 188 is formed with a longitudinally extending bore 226 which extends through annular lip 222 into proximal end portion 188*a* of the rod. Pin 225 extends from the bottom of bore 226 through an opening 227 provided in the cylindrical wall of rod 188 forming bore 226. The pin is movable relative to rod 188 between a first or retracted position in which the pin 225 is substantially recessed within opening 227, as shown in FIG. 15, and a second or extended position which the pin 225 extends radially outwardly from the rod 188, as shown in FIG. 13. A spring in the form of leaf spring 228 extends upwardly form the base of bore 226 and has an end which engages 225 to urge the pin towards its extended position. Leaf spring 228 is secured within the bore 226 by a block 229 which is press fit into the base of bore 229 or secured therein by any other suitable means. The pin 225 cooperates with an annular recess or groove 231 provided in the inner cylindrical surface of tubular piston 218 when in its extended or locking position.

Finger actuatable means is included within pipette 181 for releasing pin 225 from groove 231 so as to permit longitudinal movement of rod 188 within housing 182. Such finger actuatable means includes a button 232 made from plastic or any other suitable material. The button 232 is slidably disposed within the housing 182 for movement in a vertical direction along the longitudinal axis of ejector rod 188 and extends upwardly through an opening 233 at the top of housing 182. An inclined surface 234 is provided at the top of button 232 for facilitating actuation by depression by a thumb of a user. The button is longitudinally movable between a first or upper position shown in FIGS. 13 and 14 and a depressed position shown in FIG. 17.

An elongate member or trigger rod 236 made from metal or any other suitable material is secured to the bottom of button 232. In this regard, the top end portion of trigger rod 236 is secured within an axial bore 237 formed in the bottom of the button. Trigger rod 236 extends downwardly from button 232 for slidable disposition within bore 226 of rod 188. IN this manner, the button 232 is movable in a longitudinal direction relative to the rod 188. The slidable engagement of the trigger rod 236 with rod 188 serves to guide the button 232 in its longitudinal movement relative to rod 188 and housing 182. A spring in the form of helical spring 238 is disposed between rod 188 and button 232 for urging the button to return its upper or extended position relative to handle 182*a*. The return spring 238 is concentrically disposed about the upper portion of trigger rod 236 and has a first or upper end portion seated within an annular recess or opening 239 formed in the bottom of button 232 and a second or lower end portion disposed within annular recess provided in the top of rod annular lip 222. Annular opening 239 defines a center post 241 at the bottom of button 232 from which trigger rod 236 depends. Trigger rod 236 has a pointed lower end 242 formed in part by an inclined surface 2433 for engaging a groove 244 formed in the side of pin 225. Tapered groove 244 is formed in part by an inclined surface or ramp 246. When ejector 187 is in its upper position and piston 218 is longitudinally locked with the ejector 187 by means of pin 225, depression of button 232 to its lowermost position causes pointed end 242 of the trigger rod 236 to retract pin 225 from annular groove 231. In this operation, inclined surface 243 of the pointed end 242 engages ramp 246 on pin 225 to move the pin radially inwardly against the force of leaf spring 228.

Pipette 181 includes a release mechanism or assembly 251 actuatable by button 232 for moving brake 198 from its locked position to its unlocked or released position so as to permit ejector 187 to move downwardly to its lower position. A plate-like extension 252 extending radially from flange 223 on one side of piston 218 is included within release assembly 251. Extension 252 is preferably formed integral with flange 223. An elongate rod 253 slidably disposed within bore 254 extending through housing handle 182 in a direction parallel to the longitudinal axis of the housing 182 is further included within release assembly 251. Push or release rod 253 has a first or upper end portion 253*a* and a second or lower end portion 253*b*. The upper end portion 253*a* is engageable by extension 252 when piston 218 is released by trigger rod 236 from its upper position. Lower end portion 253*b* of the push rod 253 rests upon upper surface 203 of brake second end portion 198*b*. Movement of piston 218 from its upper longitudinal position to its lower longitudinal position on eject rod 188 causes extension 252 to engage and move the push rod 253 downwardly so that the lower end portion 253*b* of push rod urges brake second end portion 198*b* downwardly against the force of brake spring 207 and thus releases the brake.

Operation and use of pipette 181 will now be described. When the pipette 181 is in its at-rest position, as shown in FIG. 13, piston 218 is longitudinally locked to rod 188 by pin 225 and ejector 187 is in its lower position with collar 193 engaging flange 192. Return spring 238 urges button 232 and trigger rod 236 towards their respective upper positions within housing handle 182*a* and urges rod 188 to its lower position to ensure that locking pin 225 is engaged on ledge 224. Brake 198 is in its released position and button 232 is in its upper or home position fully extended from the top of housing 182. The user grasps housing handle 182*a* and mounts pipette tip 41 to shaft distal end portion 54 in a manner discussed above with respect to pipette 51. In such mounting step, the proximal end 41*a* of the pipette tip engages shaft distal end portion 54 and pushes ejector 187 from its lower position, shown in FIG. 13, to its upper position, shown in FIG. 14. Such longitudinal movement of ejector 187 results in piston flange 223 compressing eject spring 216. As rod 188 moves to its upper position, extension 252 moves upwardly to permit brake spring 207 to pivot brake 198 in a clockwise direction towards its locked position. The components of ejector assembly 186 are longitudinally sized so that brake 198 is pivoted to its locked position before rod 188 reaches its upper position (see FIG. 15). In this manner, a portion of the energy utilized to mount the pipette tip 41 onto pipette 181 is stored in the compressed eject spring 216.

After completion of the aspiration and dispensing procedure utilizing pipette tip 41, the tip 41 can be ejected form the distal end of pipette 181 by depressing button 232. As the button 232 is depressed against the relatively weak force of return spring 238, trigger rod 236 advances down piston bore 226 towards pin 225. In the manner discussed above, pointed end 242 of the trigger rod 236 engages ramp 246 in the pin 225 to retract the pin and thereby longitudinally release piston 218 form rod 188 (see FIG. 15). Upon such release, lower surface 2219 of the piston 218 accelerates under the force of eject spring 216 towards impact surface 194 on rod 188. Extension 252 engages upper end portion 253*a* of a push rod 253 as a piston 218 moves towards collar 193 to trigger movement of brake 198 to its released position. As discussed above, push rod 253 is moved downwardly by extension 252 under the force of eject spring 216 to pivot the brake 198 in a counter clockwise direction about ledge 201 against the restoring force of spring 207. The eject spring 216 has a spring constant which is greater than the spring constant of brake spring 207, and is preferably substantially greater than the spring constant of spring 207. As a result, the force of the eject spring 216 is sufficient to overcome the restoring force of the brake spring 207. The various components of ejector assembly 186 are sized so that brake 198 releases ejector 187 sometime before piston lower surface 219 engages impact surface 194, as shown in FIG. 16. Ejector 187 provides an initial ejection force to pipette tip 41 sufficient to overcome the static friction force retaining the pipette tip on the shaft distal end portion 54. Thereafter, piston 218 and eject spring 216 drive ejector 187 further downwardly relative to housing handle 182*a* to cause extension 69 to push pipette tip 41 distally on the end portion 54 (see FIG. 17). If sufficient energy is provided by the piston 218 to completely remove tip 41 from the pipette 181, the user can further depress button 232, which remains in physical engagement with eject rod 188 so long as the user retains his or her thumb on the button, to cause post 241 to manually depress ejector 187 and thus remove the tip 41 from the pipette 181. As can be seen, the invention is broad enough to cover a pipette having insufficient stored energy to push a tip 41 completely off of the pipette but sufficient to overcome the peak static friction force retaining the tip on the pipette.

After removal of pipette tip 41, the user releases button 232 so as to cause the button to return to its home position under the force of return spring 238 and likewise cause eject rod 188 to return to its lower position. This relative longitudinal separation of button 232 and eject rod 188 causes pointed end 242 of trigger rod 236 to retract form pin groove 225 and thus release locking 225. Eject spring 216 retains piston 218 in its lower position against ledge 224 after the release of button 232. The disposition of piston 218 and rod 188 in their respective lower positions causes the now released pin 225 to align and extend into the annular groove 231 in piston 218 and thereby longitudinally lock together the piston 218 and the rod 188 (see FIG. 13).

Pipette 181 incorporates features from both of pipettes 51 and 126. The energy for accelerating piston 218 is stored in eject spring 216 and supplied by the user's arms and shoulders when mounting the tip 41 onto the pipette 181. Little energy is required by the user to actuate removal of the pipette tip 41. The user merely depresses button 232 against the relatively weak force of return spring 228. In addition, the acceleration of piston 218 across the gap between piston lower surface 219 and the collar impact surface 194 provides an initial impact force on the pipette tip 41 which facilitates removal of the tip from pipette 181 and provides for an energy efficient system.

Figure 18:
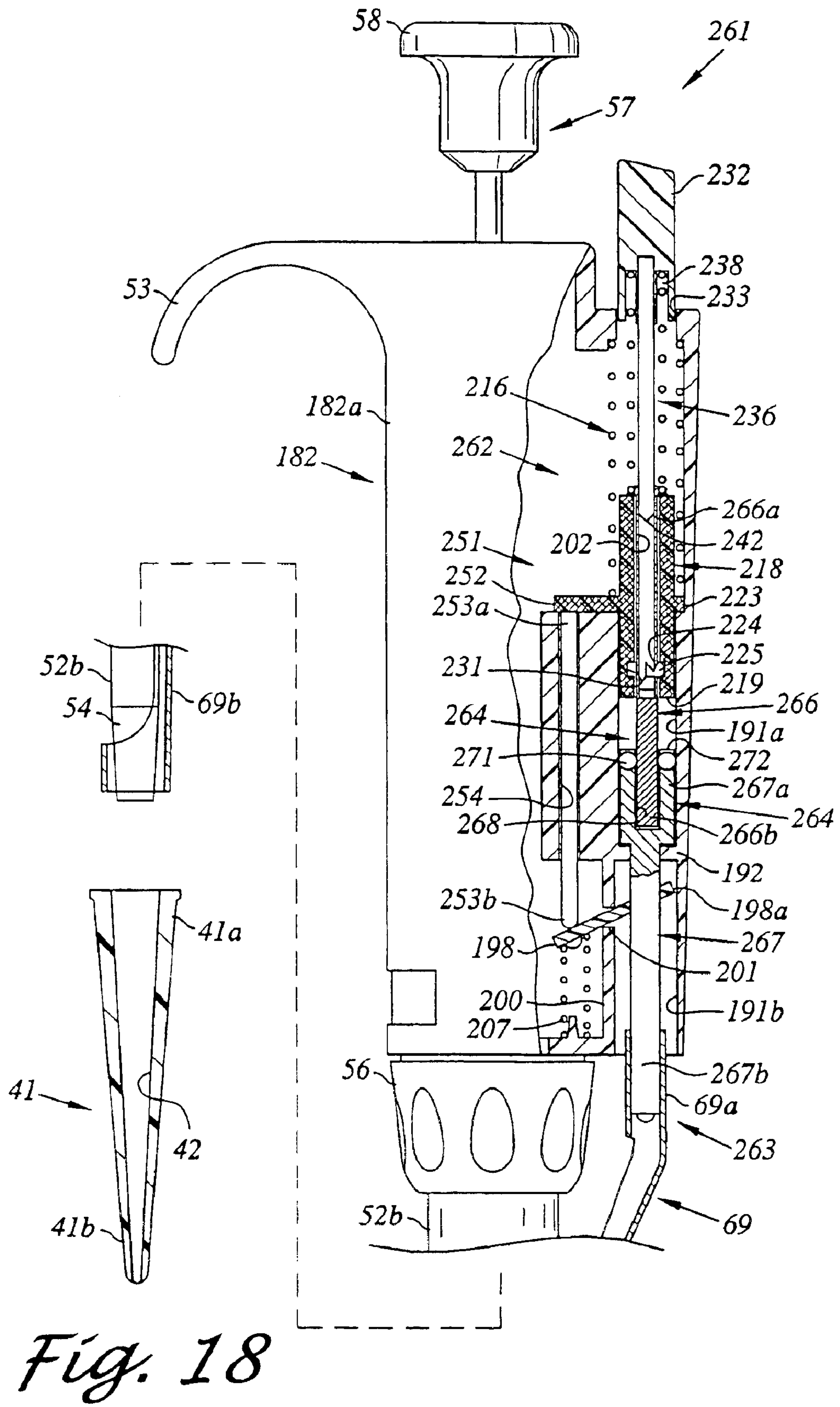
FIG. 18 is a fragmentary and partially cross-sectioned view of another embodiment of a pipette device with tip ejector utilizing stored energy in accordance with the present invention, the pipette device having no tip mounted thereon.
Figure 19:
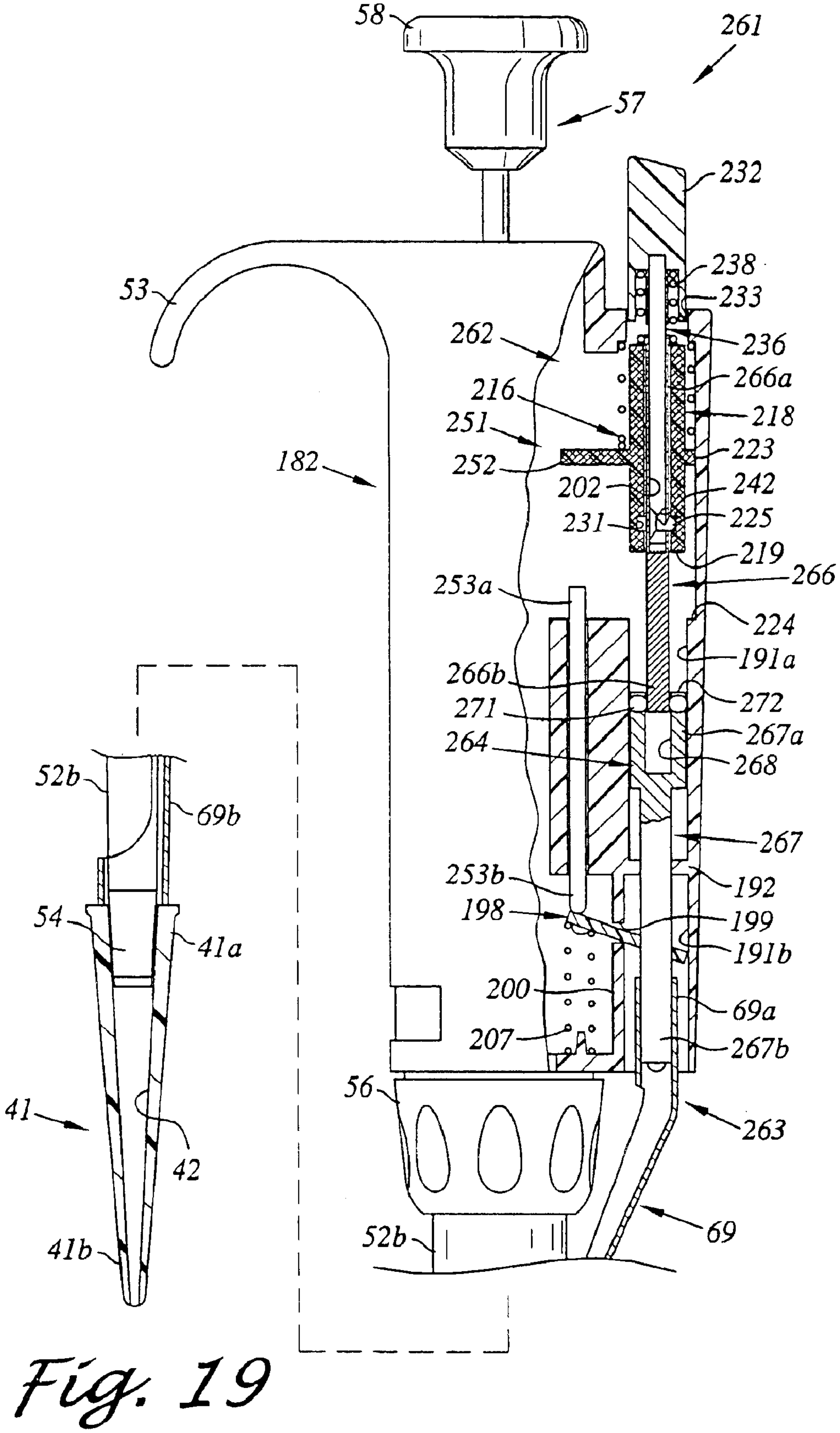
FIG. 19 is a fragmentary and partially cross-sectioned view of the pipette device of FIG. 18 with a disposable tip mounted on the shaft of the pipette device.

In certain applications for the pipette of the present invention, it is desirable to increase the acceleration gap, that is the distance a piston travels under the force of an eject spring before engaging the impact surface of an ejector, in order to convert a greater portion of the stored energy in the eject spring into piston momentum. One such embodiment of a pipette having an increased acceleration gap is shown in FIGS. 18 and 19. Pipette 261 therein is substantially similar to pipette 181 and like reference numerals have been used to describe like components of pipettes 261 and 181. An ejector assembly 262 is carried by housing and includes an ejector 263 having first and second telescoping members 266 and 267 for pushing a tip 41 off the distal end of the housing shaft 52*b*. An eject spring 216 is compressed by a piston 218 under the force of the4 ejector 263 when a user mounts a tip 41 onto the distal end portion of the shaft 52*b*. When released by the user, the piston is driven by the compressed eject spring 216 across an increased acceleration gap made possible by the telescoping together of first and second members 266 and 267 to impact a surface of the ejector to then push tip 41 off of the shaft 52*b*.

More specifically, the ejector mechanism or ejector 263 is substantially similar to ejector 187 and includes a first extremity or rod assembly 264 and a second extremity or extension 69. Rod assembly 264 is comprised of first and second telescoping members in the form of a first or upper rod 266 and a second or lower rod 267 each made from metal or any other suitable material. Upper rod 266 is substantially cylindrical in shape and has a first or proximal end portion 266*a* and a second or distal portion 266*b*. The proximal end portion 266*a* is substantially identical to proximal end portion 188*a* of rod 188 and like reference numerals have been used to describe like components of proximal end portions 266*a* and 188*a*. Lower rod 267 has a first or proximal end portion 267*a* and a second or distal end portion 267*b*. The proximal end portion 267*a* is substantially cup shaped in conformation and is provided with an axially-extending bore 268 therein for receiving distal end portion 266*b* of the upper rod 266. Distal end portion 267*b* of the lower rod is substantially identical to distal end portion of 188*b* of eject rod 188 and is secured to extension proximal end portion 69*a* in the manner discussed above. Lower rod portion 267*a* has an upper surface 272 which serves as an impact surface.

Upper rod 266 is longitudinally movable relative to lower rod 267 between a first or captured position, as shown in FIG. 18, in which distal end portion 266*b* is seated within proximal end portion 267*a* of the lower rod and a second or extended position relative to the lower rod 267, shown in FIG. 19. A plurality of roller bearing means or balls 271, two of which are shown in FIGS. 18 and 19, are circumferentially mounted about proximal end portion of 267*a* for rollably engaging the upper rod 266. More specifically, the balls are embedded in lower rod portion 267*a* and engage the inner cylindrical surface of housing 182 that forms bore upper portion 191*a* on the outside of lower rod portion 267*a*. It is desirable that the balls 271 not slip relative to either of rods 266 and 267. Accordingly, the balls 271 are force fit between the housing 182 and upper rod 266 relative to the balls under force of eject spring 216.

In an alternate embodiment, the balls 271 may be replaced by spur-like gears secured to turn on horizontal shafts connected to lower rod portion 267*a* to engage and ride up and down on gear surfaces provided on the inner surface of the bore 191*a* and on the outer surface of the rod portion 266*b*.

Tubular piston 218 of pipette 261 is moveable relative to lower rod 267 between a first or upper position, shown in FIG. 19 in which the piston is spaced apart from the lower rod 267 and a second or lower position (not shown) in which lower surface 219 of the tubular piston 218 is in contact with impact surface 272 of the lower rod 267. Movement of the piston 218 to its upper position serves to compress eject spring 216 in the manner discussed above with respect to pipette 181. When piston 218 is so disposed in its upper position, an acceleration or separation gap equal to the distance between piston lower surface 219 and impact surface 272 is provided. Spring 216 in pipette 261 may have a spring constant ranging from about 0.05 to 10 lbs/in and preferably ranging from 0.25 to 1 lb/in. The acceleration gap in pipette 261 may range from about 0.2 to 1 inch and is preferably approximately 0.6 inch.

The operation and use of pipette 261 is substantially similar to the operation of pipette 181 described above. During mounting of pipette tip 41 onto shaft distal end portion 54, the pipette tip 41 causes ejector 267 to move from its lower position, shown in FIG. 18, to its upper position, shown in FIG. 19. As lower rod 267 moves upwardly within housing 182 during this mounting step, balls 271 rollably engage the inner surface of bore upper portion 191*a* so as to cause upper rod 266 to telescope upwardly relative to the lower rod 267. The balls 271 cause upper rod 266 to travel upwardly approximately twice the distance that lower rod 267 travels upwardly within the housing 182. Eject spring 216 is compressed under the force of piston 218 during this mounting step.

After completion of the desired aspiration and dispensing procedure utilizing pipette 261, the pipette tip 41 can be pushed off of the pipette by depressing button 232 so as to retract pin 225 and thus release the piston 218 from upper rod 266. The compressed eject spring 216 accelerates the piston downwardly across the separation gap between the piston 218 and impact surface 272 causing extension 252 to engage release rod 253 and thereby release brake 198 just before the piston engages impact surface 272. The relatively high initial force generated by the piston on ejector 263 overcomes the static friction force between the pipette tip 41 and shaft distal end portion 54 to facilitate removal of the pipette tip from the shaft 52*b*.

Telescoping assembly 264 provides a coaxial 1:2 lift mechanism which approximately doubles the acceleration gap between piston 218 and impact surface 272, thereby reducing the eject force required from the eject spring 216.

This larger acceleration gap allows eject spring 216 to accelerate piston 218 a greater distance so as to increase the piston's momentum and the resulting impact force provided by the piston 218 on the lower rod 267. The peak ejection force supplied by rod 267 to tip 41 is, for a given spring constant, greater than the ejection force created by a pipette, such as pipette 181, having a shorter acceleration gap. Other mechanisms or assemblies can also be provided for creating an acceleration or separation gap that permits an impact force. For example, rotary impact using gears can be provided.

It should be appreciated that other pipettes can be provided which utilize greater than one to one lift between the eject rod and the piston-like member, such as the 1:2 lift between lower rod 267 and piston 218 of pipette 261, and be within the scope of the present invention. For example, such greater than one to one lift can be provided by pulleys and belts, gears, cams and/or levers.

The pipettes of the present invention can be automated an/or electronically controlled. An automated pipette 281 having similarities to pipettes 51 and 181 is shown in FIGS. 20–26 and like reference numerals have been used to describe like components of pipettes 281, 51 and 181. In general, pipette 281 is formed from a body or housing 282 having a first extremity or handle portion 282*a* adapted to be grasped by the hand of a user and a second extremity or shaft 52*b* adapted to removably receive a pipette tip 41. An ejector assembly 294 is carried by housing 282 and includes an ejector 296 for pushing tip 41 off of the distal end of shaft 52*b*. An eject spring 301 is compressed by a piston 302 during the dispensing stroke of an electrically controlled aspiration and dispensing assembly 286. When released by the user, the piston 302 is driven by the compressed eject spring 301 across an acceleration gap to impact a surface of the ejector 296 and cause the ejector to then push the tip 41 off of the distal end of the shaft 52*b*.

More specifically, handle portion or handle 282*a* is substantially cylindrical in shape and is sized so as to be held within the hand of the user. The housing 282 is made from plastic or any other suitable material. An electrically controlled aspiration and dispensing assembly 286 is carried by housing 282 and includes a motor 287 and a linear actuator shaft or motor shaft 288 for aspirating a liquid into and dispensing such liquid from a tip 41 mounted on shaft distal end portion 54. Vertically-disposed shaft 288 extends through motor 287 in a direction parallel to the longitudinal axis of pipette 281. The shaft 288 is driven by motor 287 between a first or upper position shown in FIG. 21, for aspirating liquid into the pipette tip 41 and a second or lower position, shown in FIGS. 20 and 22, for dispensing such liquid from the pipette tip. Electronic circuitry (not shown) is carried by the housing handle 282*a* and electrically coupled to motor 287. One or more finger actuatable means such as buttons 291 are provided for controlling the motor 287 and an optional display 292 permits monitoring of certain operations of pipette 281.

Ejector assembly 294 is carried by handle 282*a* and includes an ejector mechanism or ejector 296 having a first extremity or rod 297 slidably disposed within housing handle 282*a*. The eject rod 297 is made from metal or any other suitable material and has a first or proximal end portion 297*a* and a second or distal portion 297*b*. An extension 69 having a proximal end portion 69*a* is secured to rod distal end portion 279*b*. The ejector 296 is vertically movable within housing 282 between a first or upper position shown in FIG. 20 and a second or lower position shown in FIG. 26. The engagement of extension proximal portion 69*a* with a lower wall of handle 282*a*, shown in FIG. 20, limits such upward movement of the ejector 296. An annular collar 298 is disposed around the central portion of rod 297 and is formed with an upper or impact surface 299.

Figure 21:
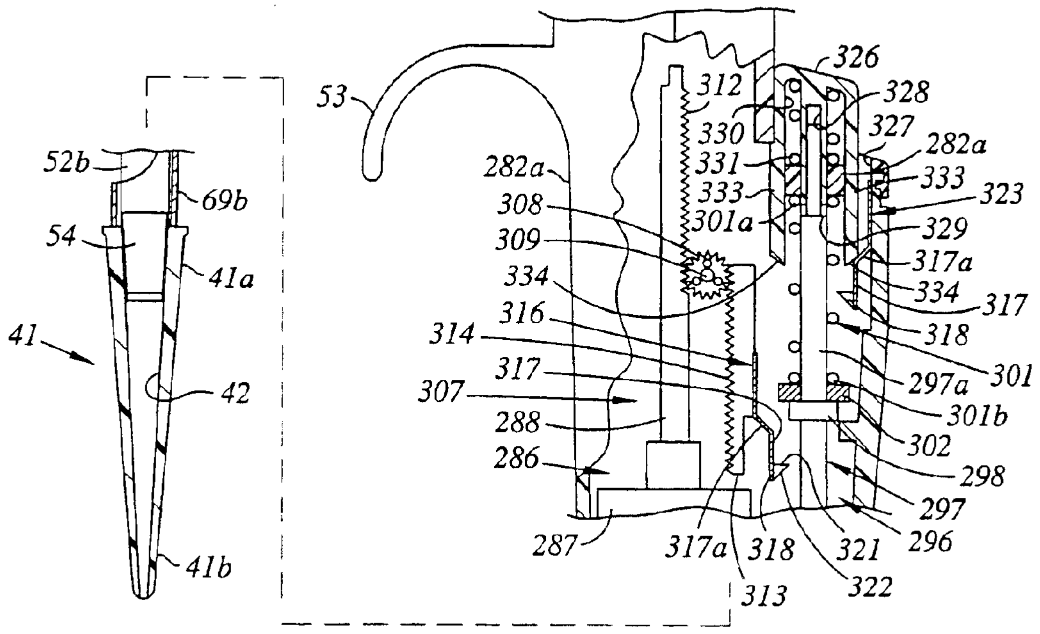
FIG. 21 is a fragmentary and partially cross-sectioned view of the pipette device of FIG. 20 in an aspirate position.
Figure 22:
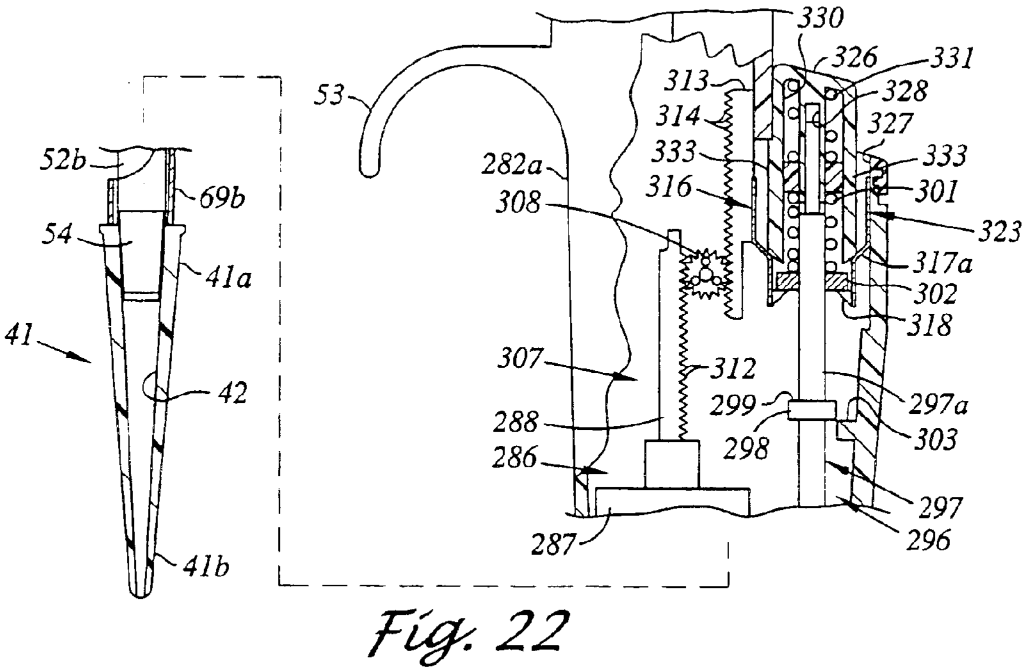
FIG. 22 is a fragmentary and partially cross-sectioned view of FIG. 20 in a dispense position.
Figure 23:
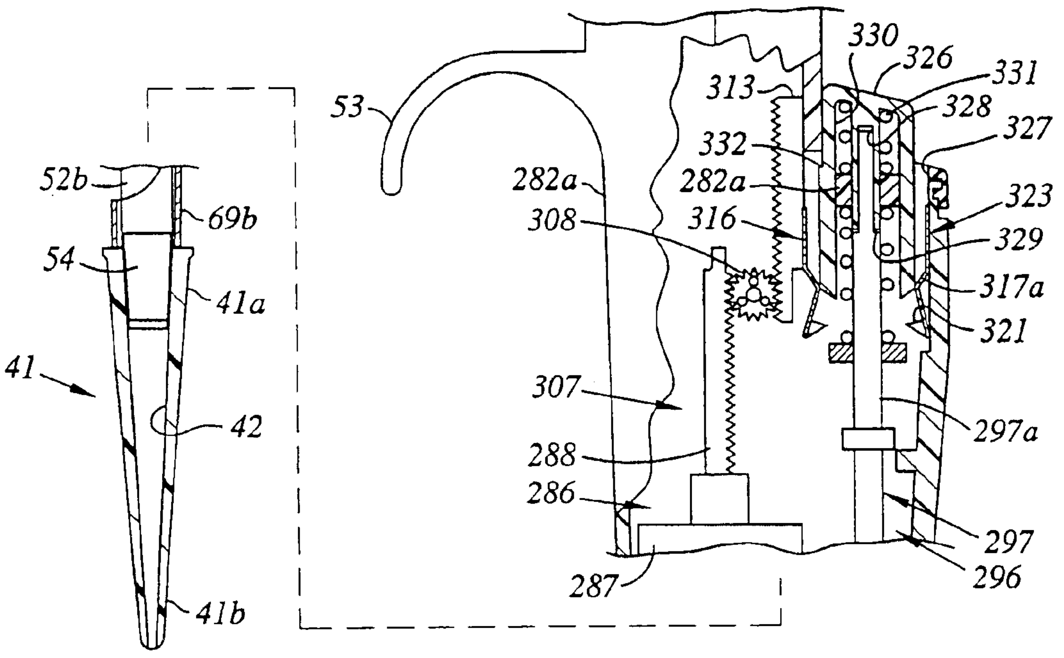
FIG. 23 is a fragmentary and partially cross-sectioned view of the pipette device of FIG. 20 in a first ejection condition following actuation of the eject button and release of a piston.
Figure 24:
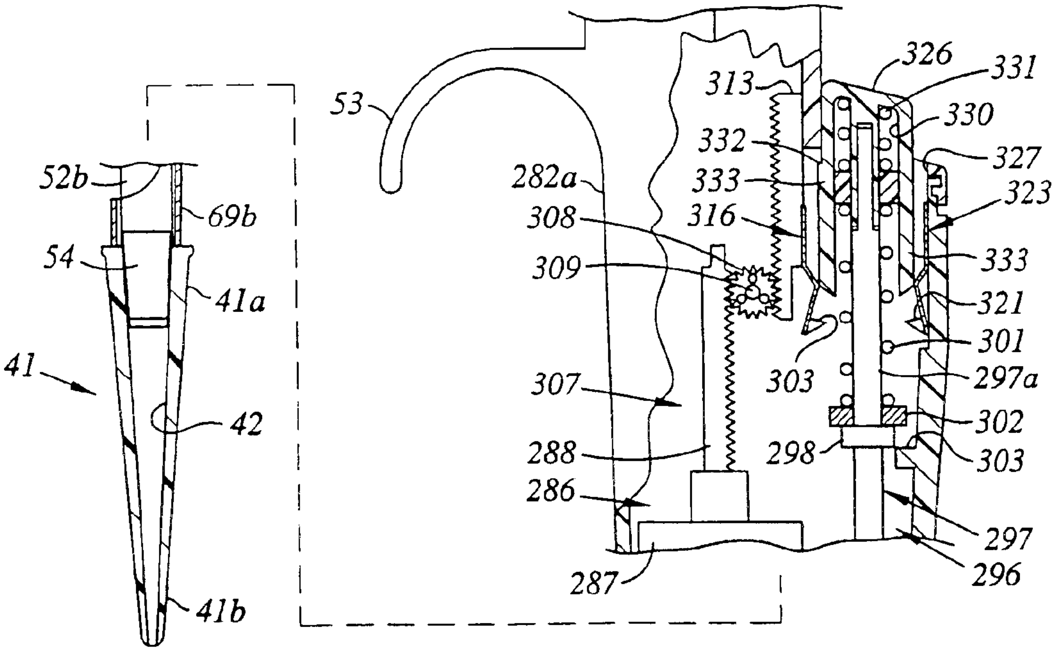
FIG. 24 is a fragmentary and partially cross-sectioned view of the pipette device of FIG. 20 in a second ejection condition following impact of the piston with the eject rod.
Figure 25:
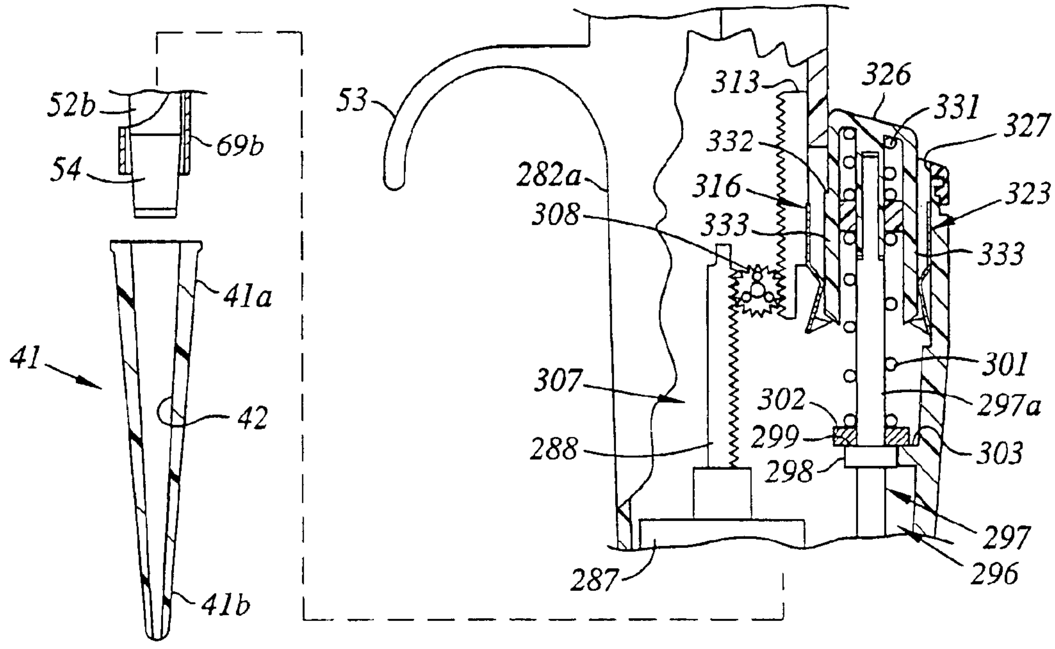
FIG. 25 is a fragmentary and partially cross-sectioned view of the pipette device of FIG. 20 in a third ejection condition following manual actuation of the eject rod by the eject button.

Compressible spring means or spring 301 is carried within housing 282 and is preferably disposed concentrically around at least a portion of the rod 297. Eject spring 301 has first or upper and second or lower end portions 301*a* and 301*b* and a spring constant ranging from 0.05 to 40 lbs/in and preferably ranging from 0.5 to 5 lbs/in. Means is included within pipette 281 for compressing eject spring 301 and preferably includes a flange member or piston 302 slidably disposed on rod proximal end portion 297*a*. Piston 302 can be made from metal or any other suitable material. Eject spring 301 is disposed between housing 282 and piston 302 with upper end portion 301*a* seated against the housing and lower end housing 301*b* seated on piston 302. The piston 302 is movable along rod 297 between a first or upper position in which the piston is spaced apart from impact surface 299, as shown in FIG. 22, and a second or lower position in which the piston is seated on collar 298, as shown in FIG. 21. The gap between the lower planar surface of the piston 302 and the impact surface 299 of collar 298 is referred to herein as the acceleration or separation gap and can range from 0.04 to 1 inch and is preferably approximately 0.1 inch. A ledge 303 extends inwardly form housing handle 282*a* and limits the lower travel of piston 302 within the housing when collar 298 moves downwardly in the housing below the ledge 303.

Aspirating and dispensing assembly 286 is included within motorized assembly 306 of pipette 281 for moving piston 302 from its lower position to its upper position. In this regard, shaft 288 is included within a cog and gear assembly 307 of motorized assembly 306. Assembly 307 further includes a gear 308 pivotably mounted to housing handle 282 by means of a pin 309 or any other suitable means and engageable with a plurality of teeth 312 longitudinally spaced apart along one side of the upper end portion of shaft 288. An elongate slave member or lifter 313 is slidably carried within the housing handle 282 by any suitable means (not shown) for longitudinal movement in a direction parallel to the longitudinal axis of pipette 281 between a first or lower position, shown in FIG. 21, and a second or upper position, shown in FIG. 22. Lifter 313 has a plurality of longitudinally spaced-apart teeth 314 along one side thereof which engage gear 308 diagonally opposite the teeth 312 of shaft 288. Gear 308 is thus disposed between shaft 288 and lifter 313 so that movement of shaft 288 to its upper of aspirating position results in lifter 313 being moved to its lower or dispensing position and, conversely, movement of the shaft 288 to its lower position drives the lifter 313 to its upper position.

A hook 316 is secured to the backside of lifter 313 and includes a flexible arm 317, made from metal or any other suitable material, and a rigid end piece 318 having an upper surface forming a ledge 321 and an inclined lower surface 322. Arm 317 is provided with an inclined portion 317*a*. During movement of lifter 313 to its upper position, ledge 321 engages the underside of piston 302 to urge the piston to its upper position spaced apart from impact surface 299. In this manner, movement of shaft 288 to its aspirating position results in drive piston 302 being moved against the force of eject spring 301 to its upper or engaged position.

An addition or second hook 323 is included with the locking means of pipette 281 for retaining piston 302 in its upper position and thus retaining eject spring 301 in its compressed position. Additional hook 323 is substantially similar to hook 316 and is secured to housing 282. As drive piston 302 moves to it upper position, the piston engages inclined surface 322 of hook 323 which causes the hood to bend at arm 317 and permits the piston 302 to pass end piece 318. The end piece 318 the returns to its home position wherein ledge 321 of the additional hook 323 is disposed beneath piston 302 for assisting in the retention of the piston 302 in its upper position (See FIG. 22).

Finger actuatable means is included within pipette 281 for releasing hooks 316 and 323 so that ejector 296 is driven by eject spring 301 to its lower position. Such finger actuatable means includes a button 326 slidably disposed within housing handle 282*a* and extending upwardly through an opening 327 in the top of the handle. The button 326 is provided with an axial bore 328 extending upwardly into the underside of the button for slidably receiving rod proximal end portion 297*a*. A shoulder 329 is formed on the rod proximal end portion 297*a* for limiting the downward slidable movement of the button 326 on the rod 297. A recess 330 is formed in the underside of button 326 and is preferably concentrically disposed about bore 328 for receiving at least a portion of a return spring 331 disposed between the button 326 and housing 282. Spring 331 serves to urge button 326 upwardly to its upper and extended position. The button 326 is provided with a shoulder 332 for catching on a portion of the housing 282 so as to limit the upward travel of the button 326. Button 326 has first and second depending prongs 333 having respective inclined forward surfaces 334. Upon depression of button 326, the inclined surfaces 334 of prongs 333 cooperatively engage with respective inclined portions 317*a* of hook arms 317 to separate the hoods 316 and 323 from each other and thus move ledges 321 out from under drive piston 302.

Figure 20:
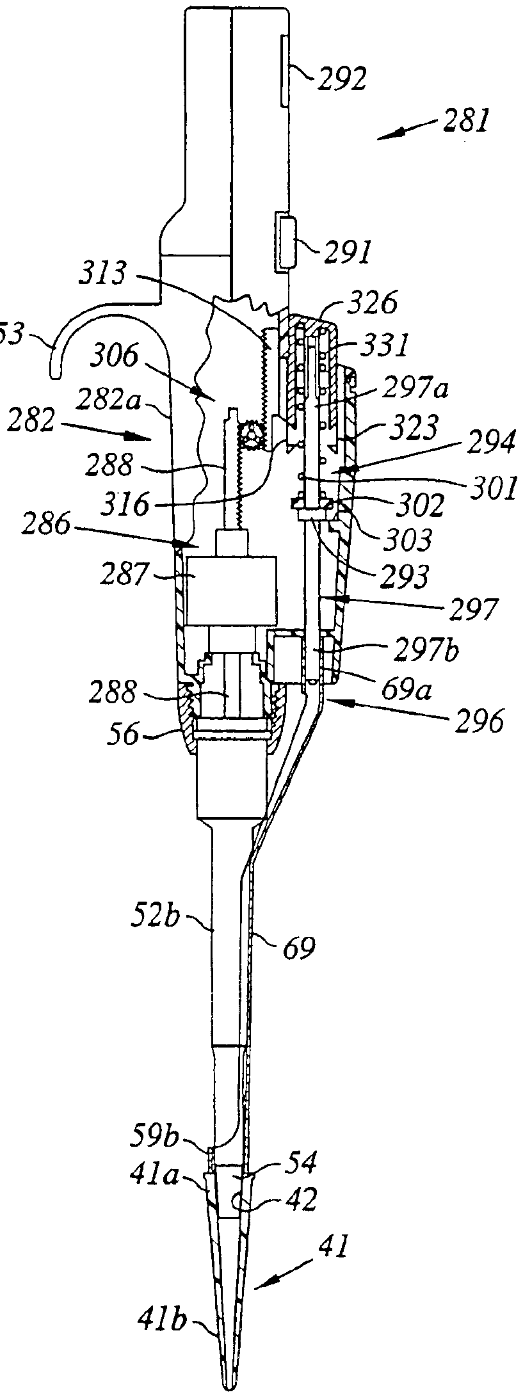
FIG. 20 is a side elevational view, partially cross-sectioned, of another embodiment of a pipette device with tip ejector utilizing stored energy in accordance with the present invention with a tip mounted on the shaft of the pipette device.
Figure 26:
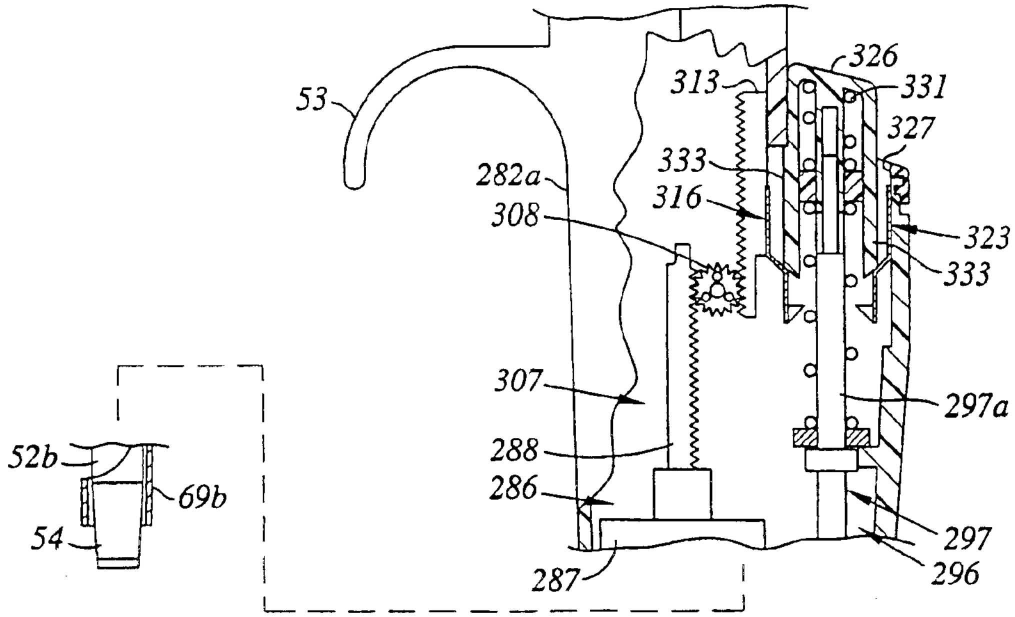
FIG. 26 is a fragmentary and partially cross-sectioned view of the pipette device of FIG. 20 in a recoil position with the tip ejected.

In operation and use of pipette 281, the mounting of pipette tip 41 onto shaft distal end portion 54 causes ejector 296 to move from its lower position shown in FIG. 26 to its upper position shown in FIG. 20. As the rod 297 moves to its upper position, collar 398 thereon contacts piston 302 and carries the piston upwardly within housing 282. This upward movement of piston 302 slightly compresses eject spring 301. During operation of pipette 281, shaft 288 is moved upwardly by motor 287 when liquid is dispensed from housing 282. As shown in FIGS. 20 and 21, aspiration of a liquid causes lifter 313 to be driven by gear 308 to its lower position. Inclined lower surface 322 on hook 316 permits end piece 318 to move radially outwardly relative to rod 297 as the end piece 318 passes piston 302 in this downward stroke. While the liquid is being dispensed from the pipette 281, shaft 288 is driven downwardly to its dispensing position by motor 287 causing lifter 313 to move upwardly. As discussed above, ledge 321 on hook 315 engages the underside of piston 302 and moves the piston to its upper position where the piston is retained by hooks 316 and 323. During any subsequent aspirating and dispensing procedures, hook 316 is moved upwardly and downwardly beneath the piston 302 while the piston is retained in its upper position by hook 323.

Upon completion of the duty cycle of pipette 281, pipette tip 41 is pushed off shaft distal end portion 54 by the user depressing button 326. The downward movement of the button causes prongs 333 to engage arms 317 of hooks 315 and 323 so as to release the piston 302 from the hooks 316 and 323 in the manner discussed above. Eject spring 310 then drives piston 302 through the acceleration gap so that the accelerated piston 302 impacts collar 298 to provide an initial tip ejection force for overcoming the static retention force retaining the pipette tip 41 on shaft distal end portion 54. Collar 298 on rod 297 is driven downwardly by piston 302 until the tip 41 is free from the shaft distal end portion 54 and the piston 302 engages housing ledge 303. If the momentum of piston 302 and the stored energy remaining in eject spring 301 is insufficient to fully remove tip 41 from the shaft distal end portion 54, rod 297 can be manually moved further downwardly by means of the user further depressing the button, which seats on angular shoulder 329 provided on rod proximal end portion 297*a*, to finish tip removal manually. Upon removal of the pipette tip 41 from the shaft 52*b*, the user releases button 326 so as to allow return spring 331 to move the button 326 to its upper or home position shown in FIG. 26.

Although the compressible spring means of the present invention has been shown as being a helical spring, it should be appreciated that other types of springs can be used without departing from the scope of the invention. For example, the energy storage spring can be a torsional bar, a gas filled cylinder such as an air spring, or opposing magnetic fields where the stored energy is stored in the magnetic fields of two magnets that are oriented to repel each other.

Figure 27C:
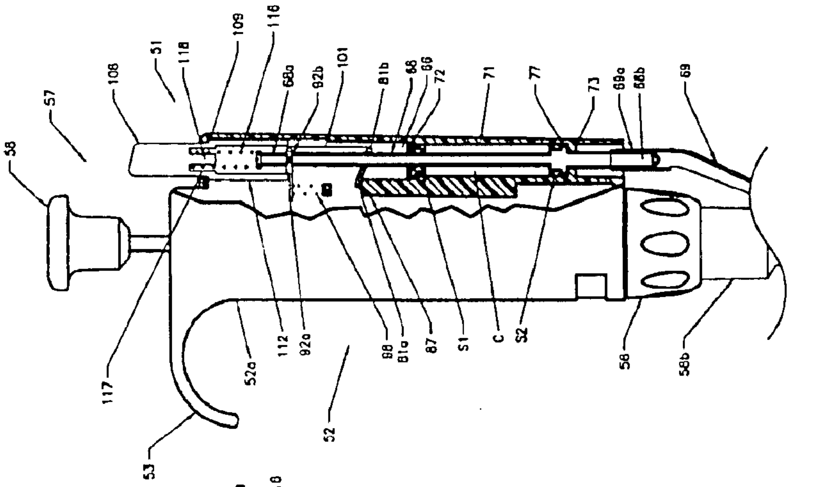
FIGS. 27*a, b* and *c* are fragmentary and partially cross-sectioned views of the pipette of FIG. 7 wherein the energy storage spring is replaced by (a) opposing magnets, (b) a rubber spring and (c) a an air spring respectively.
Figure 27B:
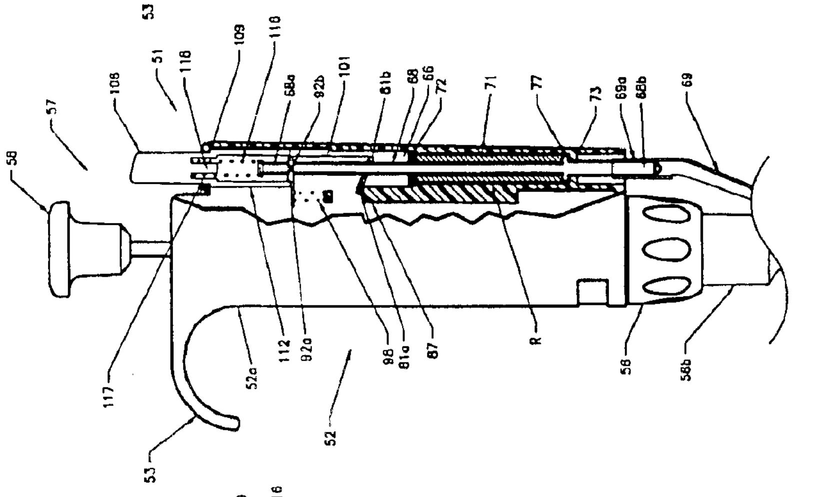
Figure 27A:
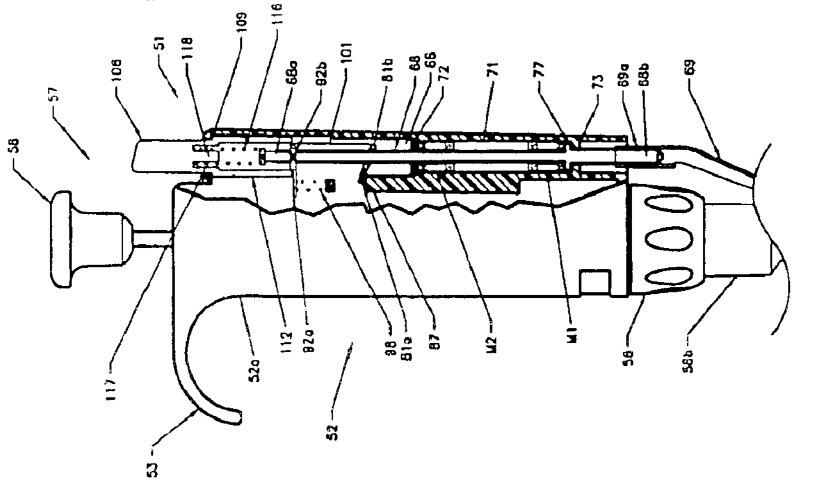
Figures 28A, 28B, 28C:
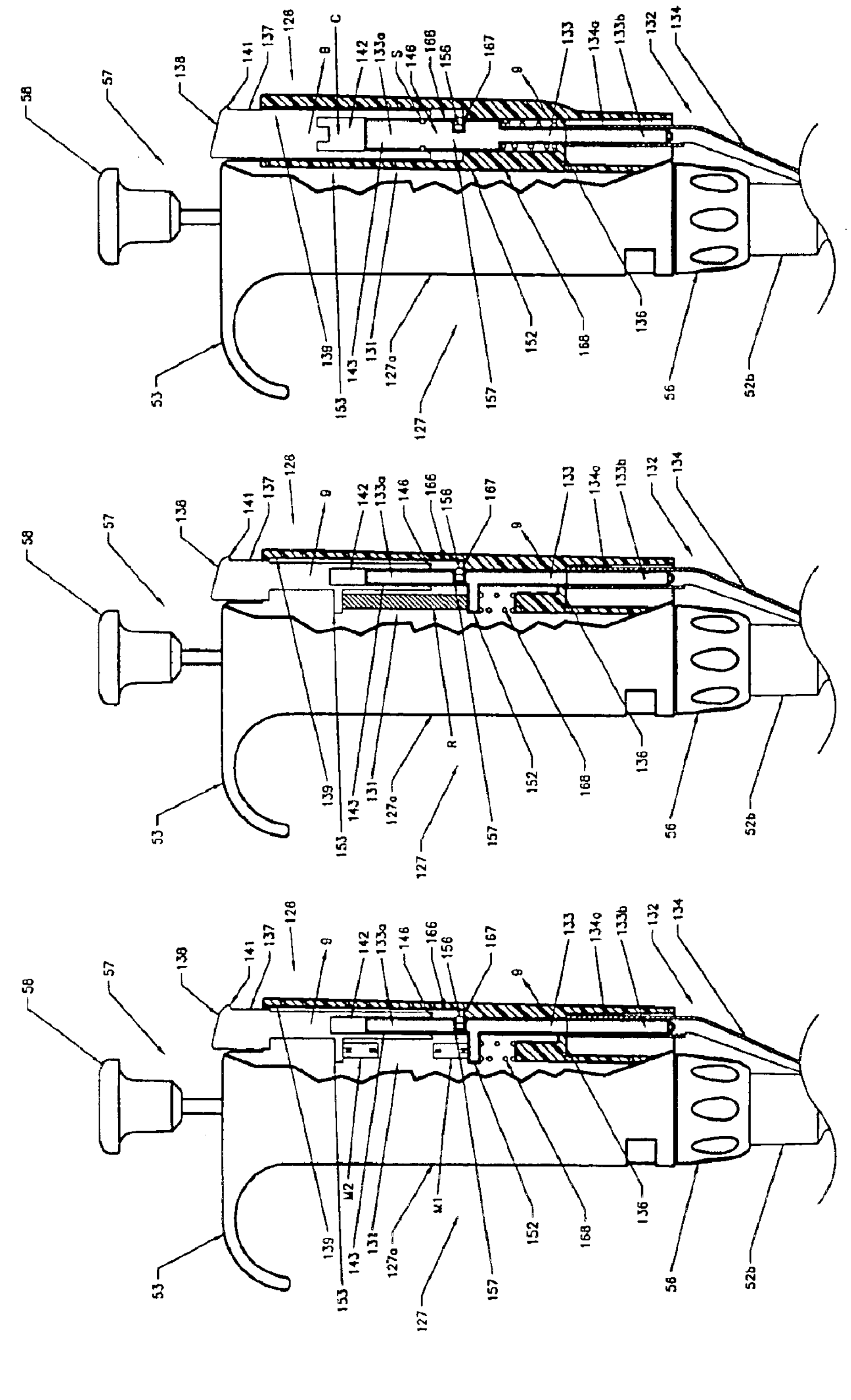
FIGS. 28*a, b* and *c* are fragmentary and partially cross-sectioned views of the pipette of FIG. 8 wherein the energy storage spring is replaced by (a) opposing magnets, (b) a rubber spring and (c) a an air spring respectively.
Figure 29C:
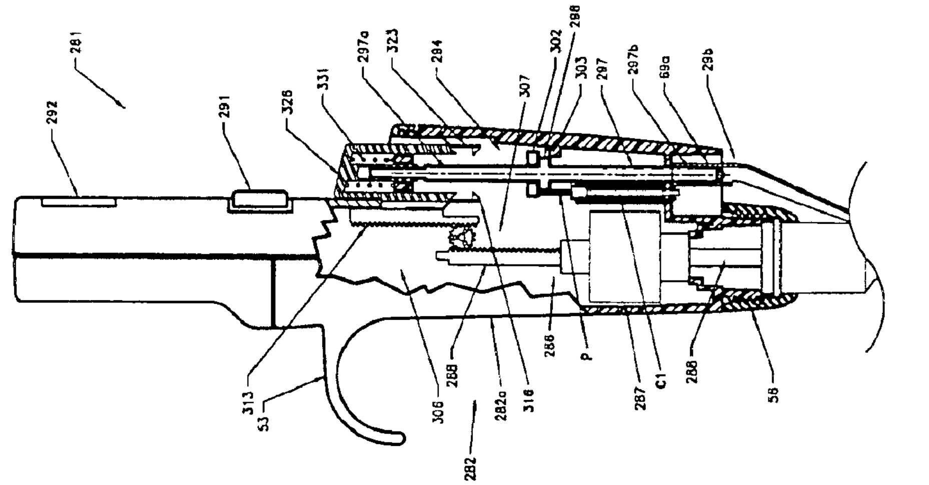
FIGS. 29*a, b* and *c* are fragmentary and partially cross-sectioned views of the pipette of FIG. 20 wherein the energy storage spring is replaced by (a) opposing magnets, (b) a rubber spring and (c) a an air spring respectively.
Figure 29B:
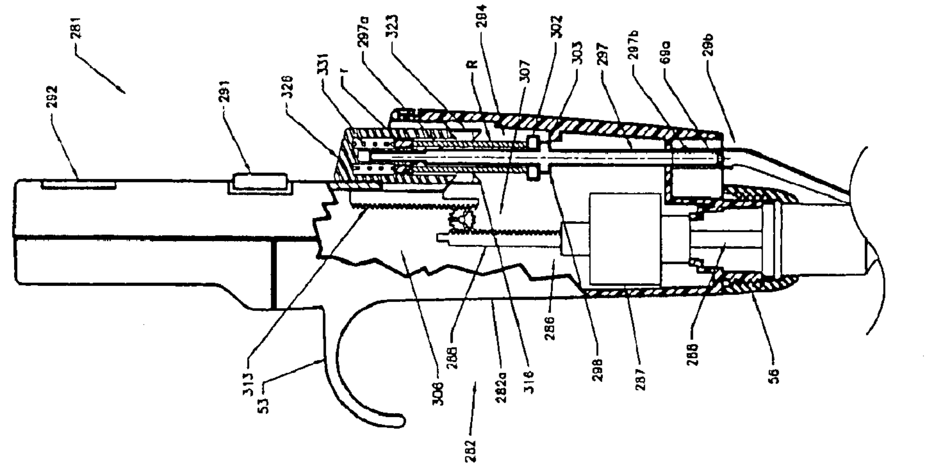
Figure 29A:
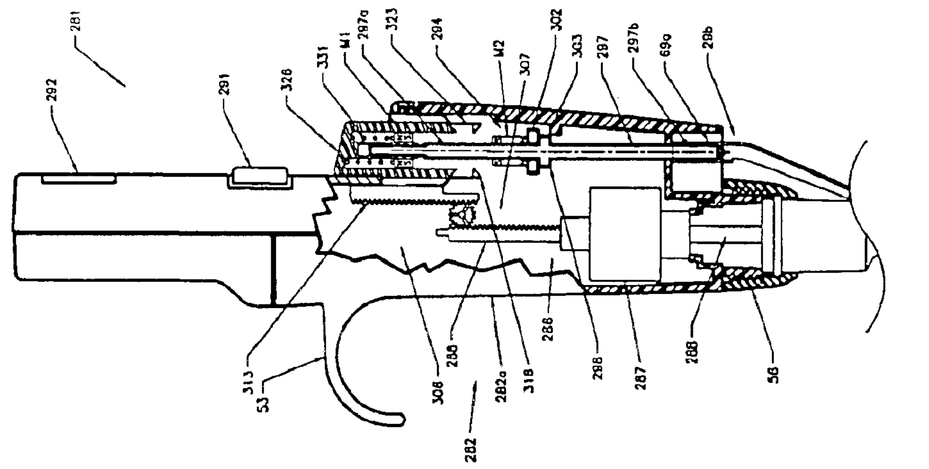

Specifically, FIGS. 27*a*, 28*a* and 29*a* illustrate pipette embodiments wherein the energy storage spring comprises two magnets m1 and m2 replacing the energy storage springs 76, 151 and 331 in the embodiments previously described relative to FIGS. 7, 8 and 20 respectively. In FIGS. 27*a*, 28*a* and 29*a* pipette components corresponding to those of FIGS. 7, 8 and 20 bear the same numerals as in FIGS. 7, 8 and 20 and function as previously described relative to FIGS. 7, 8 and 20.

In FIG. 27*a*, the magnet m1 is secured by the rod retainer 72 to the pipette housing as a stationary magnet while the magnet m2 is carried by the collar 77 to travel with the rod 68. As shown, the magnets m1 and m2 are oriented to repel each other such that as the magnet m2 moves upward with the rod 68 as the pipette tip is mounted on the mounting shaft of the pipette, the opposing magnetic fields from the magnets combine and store magnetic energy which increases as the magnets approach each other. When the brake mechanism 81 of FIG. 7 is released, energy stored in the magnetic fields drives the magnets m1 and m2 apart rapidly moving the rod 68 downward so as to produce an ejection of the pipette tip from the mounting shaft.

In FIG. 28*a*, the magnet m1 is secured to the rod extension 152. When the rod 133 is locked relative to the pipette housing, the magnet ml functions as a stationary magnet while the magnet m2 is secured to the extension 153 from the button 137 to travel therewith. As shown, the magnets m1 and m2 are oriented to repel each other such that as the magnet m2 moves downward with the button, the magnetic fields combine and store magnetic energy which increases in opposing force as the magnets approach each other. When the locking means 156 of FIG. 8 is released, energy stored in the magnetic fields drives the magnets m1 and m2 apart rapidly moving the rod 133 so as to produce an ejection of the pipette tip from the mounting shaft.

In FIG. 29*a*, the magnet m1 is secured to the rod end portion 297*a* and functions as a stationary magnet relative to the magnet m2 which rides on the rod 297 to travel upward toward the magnet with upward movement of the hooking members 316, 323 controlled by the assembly 286 including the motorized assembly 306 and cog and gear assembly 307 of FIG. 20. As shown, the magnets m1 and m2 are oriented to repel each other such that as the magnet m2 moves upward on the rod 297, the magnetic fields combine and store magnetic energy which increases in opposing force as the magnets approach each other. When downward movement of the push button 326 effects a release of the hooking member 316, 323 and the magnet m2, energy stored in the magnetic fields drives the magnet m2 downward to impact the collar 298 on the rod so as to produce an ejection of the pipette tip from the mounting shaft.

Specifically, FIGS. 27*b*, 28*b* and 29*b* illustrate pipette embodiments wherein the energy storage spring comprises a rubber spring R such as a compressible rubber cylinder or sleeve, replacing the energy storage springs 76, 151 and 331 in the embodiments previously described relative to FIGS. 7, 8 and 20 respectively. In FIGS. 27*b*, 28*b* and 29*b* pipette components corresponding to those of FIGS. 7, 8 and 20 bear the same numerals as in FIGS. 7, 8 and 20 and function as previously described relative to FIGS. 7, 8 and 20 and the springs R function in the same manners as the helical metal springs they replace. Please note that in FIG. 28*b* the upper end of the rubber spring R is secured to retainers r which extend through openings in the button 326 for connection to the pipette housing.

Specifically, FIGS. 27*c* and 28*c* illustrate pipette embodiments wherein the energy storage spring comprises an air spring C replacing the energy storage springs 76 and 151 in the embodiments previously described relative to FIGS. 7 and 8 respectively. In FIGS. 27*c* and 28*c* pipette components corresponding to those of FIGS. 7 and 8 bear the same numerals as in FIGS. 7 and 8 and function as previously described relative to FIGS. 7 and 8 and the air springs C function in the same manners and the helical metal springs they replace. For example, in FIG. 27*c*, the air spring C comprises a sealed gas containing chamber around the rod 68, the rod passing through a stationary upper seal s1 secured to the rod retainer 72 and lower seal s2 secured to the rod collar 77. As the rod 68 moves upward in response to insertion of a tip on the pipette mounting shaft, the lower seal s2 moves with the rod toward the upper fixed seal s1 to compress the gas within the chamber C. Upon a release of the brake mechanism 81, the compressed gas will force the lower seal s2 and rod 68 downward to effect a removal of the pipette tip from the mounting shaft.

Similarly, in FIG. 28*c*, downward movement of the button 137 will produce a compression of a gas within a sealed chamber C defined by the bore 142 and a seal s between rod portion 133*a* and the recess 166. When the locking means 156 is released by downward movement of the button 137, the compressed gas will drive the rod 133 downward to effect an ejection of the pipette tip.

In FIG. 29*c*, the air spring comprises a vacuum source including an air cylinder C1 having a piston p secured to the piston 302 carried by the rod 297. When operation of the assembly 286 as described relative to FIG. 20 produces an engagement of the hook members 316, 323 and the piston 302, the piston p will move upward with the piston 302 to produce a vacuum within the cylinder c1. Upon release of the hook members in response to downward movement of the button 326, the vacuum will drive the piston p and piston 302 downward to effect an ejection of a pipette tip from the pipette mounting shaft as previously described in connection with FIG. 20.

It should be appreciated that pipettes of the present invention can be other than hand held. For example, the invention is broad enough to cover robotic pipettes which are manually controlled, by means of a computer screen, keyboard, mouse or other suitable means, or automated so as to not include any finger actuatable means. The utilization of stored energy for tip removal in such robotic pipette advantageously reduces the forces required for tip removal.

From the foregoing, it can be seen that a pipette which stores energy for later use in removing a tip has been provided. An energy storage which may comprise one of a variety of spring means is provided in the pipette for storing such energy. The stored energy can be supplied from mounting the tip onto the pipette, from a user's thumb or fingers and/or from an automated aspirating and or dispensing of a liquid by the pipette. An impact force can optionally be provided to initiate removal of the tip and the impact force can be created by accelerating a piston-like member across a gap. The pipette can be of a hand-held type which minimizes stresses on the user's thumb or fingers.

What is claimed is:

1. A pipette for use with a pipette tip to aspirate and dispense a quantity of liquid, comprising:

a housing;

a pipette tip mounting shaft extending from the housing to receive a pipette tip;

a pipette tip ejector mechanism for ejecting the pipette tip from the mounting shaft;

energy storage means;

means responsive to the insertion of the pipette tip onto the mounting shaft for storing energy in the energy storage means; and means for releasing energy from the energy storage means to assist the tip ejector mechanism in the ejecting of the pipette tip from the mounting shaft.

2. A mechanism for facilitating the removal of a pipette tip from a pipette nozzle comprising a mechanism which stores energy as said pipette tip is mounted on said nozzle and which releases the stored energy when said pipette tip is to be removed to facilitate the removal thereof.

3. The pipette of claim 1 wherein the tip ejector mechanism includes a tip ejection member for ejecting the pipette tip from the mounting shaft and wherein the means for releasing energy releases energy from the energy storage means to move the tip ejection member.

4. The pipette of claim 3 wherein the ejector mechanism is carried by the housing and the tip ejection member is movable from a first position which permits the pipette tip to be inserted onto the mounting shaft and a second position wherein the pipette tip is ejected by the tip ejection member engaging and ejecting the pipette tip from the mounting shaft.

5. The pipette of claim 3 wherein the energy storage means comprising a spring means for storing energy.

6. The pipette of claim 5 wherein:

the spring means for storing energy in the energy storage means comprises means responsive to the insertion of the pipette tip onto the mounting shaft for compressing the spring means to store energy in the energy storage means and holding means for retaining the spring means in a compressed condition; and the means for releasing energy from the energy storage means comprises means for releasing the holding means to drive the tip ejection member against the pipette tip and the tip off of the mounting shaft.

7. The pipette of claim 5 wherein:

the spring means for storing energy in the energy storage means comprises means responsive to movement of the tip ejection member in a first direction for compressing the spring means to store energy in the energy storage means and holding means for retaining the spring means in a compressed condition; and the means for releasing energy from the energy storage means comprises means for releasing the holding means to drive the tip ejection member in a second direction to eject the tip from the mounting shaft.

8. The pipette of claim 6 wherein the holding means comprises a brake mechanism characterized by (i) a locked condition in which the spring means may be compressed by movement of the pipette tip onto the mounting shaft while blocking movement in an opposite direction relative to the mounting shaft and (ii) an unlocked condition in which the spring means is released to drive the tip ejection member in a direction which ejects the tip from the mounting shaft.

9. The pipette of claim 1 wherein the housing is hand holdable by a user of the pipette and the means for releasing energy from the energy storage means is operable by the user.

10. The pipette of claim 6 wherein the means for compressing the spring means includes the tip ejection member, the spring means having a first end portion fixed relative to the housing and a second end portion moveable with the tip ejection member.

11. The pipette of claim 5 wherein the tip ejection member includes an impact surface and wherein the pipette further includes a piston responsive to energy released by the energy storage means for striking the impact surface to assist in driving the pipette tip from the mounting shaft.

12. The pipette of claim 6 wherein the tip ejection member includes an impact surface and wherein the pipette further includes a piston responsive to energy released by the energy storage means for striking the impact surface to assist in driving the pipette tip from the mounting shaft.

13. The pipette of claim 7 wherein the tip ejection member includes an impact surface and wherein the pipette further includes a piston responsive to energy released by the energy storage means for striking the impact surface to assist in driving the pipette tip from the mounting shaft.

14. In a pipette having a nozzle to which a pipette tip may be mounted, a mechanism for facilitating removal of a pipette tip from the nozzle, comprising:

a spring loaded tip ejection member terminating near an end of the nozzle to which a pipette tip may be mounted when the ejection member is in a normal position, the ejection member being moveable away from said end of the nozzle to a retracted position against said spring load when the pipette tip is mounted on said nozzle;

holding means for holding the ejection member in the retracted position against said spring load; and means for releasing the holding means to permit the ejection member to return to the normal position in response to said spring load to assist in ejection of the pipette tip from the nozzle.

15. The mechanism of claim 14 wherein the ejection member is moved away from said end of the nozzle by said pipette tip.

16. A mechanism for facilitating the removal of a pipette tip from a pipette nozzle including an ejector member normally biased to a first position near an end of said nozzle to which said tip is to be mounted, and movable as said tip is mounted to said nozzle against the bias, the ejector member reaching a retracted position when the tip is fully mounted on said nozzle;

holding means for holding the ejector member in the retracted position against said bias; and means for releasing the holding means to permit the ejector member to return to the first position in response to said bias to assist in ejection of the pipette tip from the nozzle.

17. The pipette of claim 5 wherein the spring means comprises opposing magnetic fields generated by magnets oriented to repel each other.

18. The pipette of claim 5 wherein the spring means comprises an air spring.

19. The pipette of claim 5 wherein the spring means comprises a rubber spring.

* * * * *